(12) United States Patent
Munisteri

(10) Patent No.: US 10,273,172 B2
(45) Date of Patent: *Apr. 30, 2019

(54) FRACTURE WATER TREATMENT METHOD AND SYSTEM

(71) Applicant: MBL Water Partners, LLC, Houston, TX (US)

(72) Inventor: Joseph G. Munisteri, Houston, TX (US)

(73) Assignee: MBL Partners, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/288,360

(22) Filed: Oct. 7, 2016

(65) Prior Publication Data

US 2017/0021288 A1 Jan. 26, 2017

Related U.S. Application Data

(60) Continuation of application No. 14/338,861, filed on Jul. 23, 2014, now abandoned, which is a division of
(Continued)

(51) Int. Cl.

| | |
|---|---|
| C02F 1/48 | (2006.01) |
| C02F 1/00 | (2006.01) |
| B01D 19/00 | (2006.01) |
| B01D 21/34 | (2006.01) |
| E21B 43/267 | (2006.01) |
| E21B 21/06 | (2006.01) |
| B01D 17/02 | (2006.01) |
| B01D 21/02 | (2006.01) |
| B01D 17/12 | (2006.01) |
| B01D 21/24 | (2006.01) |
| B01D 17/04 | (2006.01) |

(Continued)

(52) U.S. Cl.
CPC .......... *C02F 1/484* (2013.01); *B01D 17/0208* (2013.01); *B01D 17/0214* (2013.01); *B01D 17/04* (2013.01); *B01D 17/12* (2013.01); *B01D 19/00* (2013.01); *B01D 19/0063* (2013.01); *B01D 19/0068* (2013.01); *B01D 21/0009* (2013.01); *B01D 21/10* (2013.01); *B01D 21/24* (2013.01); *B01D 21/2494* (2013.01); *B01D 21/34* (2013.01); *C02F 1/008* (2013.01); *C02F 1/487* (2013.01); *E21B 21/065* (2013.01); *E21B 43/26* (2013.01); *E21B 43/267* (2013.01); *E21B 43/34* (2013.01); *C02F 2101/32* (2013.01); *C02F 2103/06* (2013.01); *C02F 2103/10* (2013.01); *C02F 2201/483* (2013.01); *C02F 2209/005* (2013.01); *C02F 2209/02* (2013.01); *C02F 2209/42* (2013.01)

(58) Field of Classification Search
None
See application file for complete search history.

(56) References Cited

U.S. PATENT DOCUMENTS

| | | | | |
|---|---|---|---|---|
| 6,238,546 | B1 * | 5/2001 | Knieper | C02F 1/46104 |
| | | | | 204/269 |
| 2009/0095352 | A1 * | 4/2009 | Kovalcik | C02F 1/48 |
| | | | | 137/13 |
| 2012/0181014 | A1 * | 7/2012 | Daussin | E21B 43/267 |
| | | | | 166/90.1 |

\* cited by examiner

*Primary Examiner* — Richard C Gurtowski
(74) *Attorney, Agent, or Firm* — Karen B. Tripp

(57) ABSTRACT

A method and system for treatment of flow-back and produced water from a hydrocarbon well in which fracturing operations are carried out using a phase separation and creating of positive charge in the water.

11 Claims, 25 Drawing Sheets

Related U.S. Application Data application No. 14/095,346, filed on Dec. 3, 2013, now abandoned, which is a continuation of application No. 13/832,759, filed on Mar. 15, 2013, now abandoned, which is a continuation-in-part of application No. 13/594,497, filed on Aug. 24, 2012, now Pat. No. 8,424,784.

(60) Provisional application No. 61/676,628, filed on Jul. 27, 2012.

(51) Int. Cl.
| | |
|---|---|
| *E21B 43/26* | (2006.01) |
| *E21B 43/34* | (2006.01) |
| *B01D 21/00* | (2006.01) |
| *C02F 103/06* | (2006.01) |
| *C02F 103/10* | (2006.01) |
| *C02F 101/32* | (2006.01) |

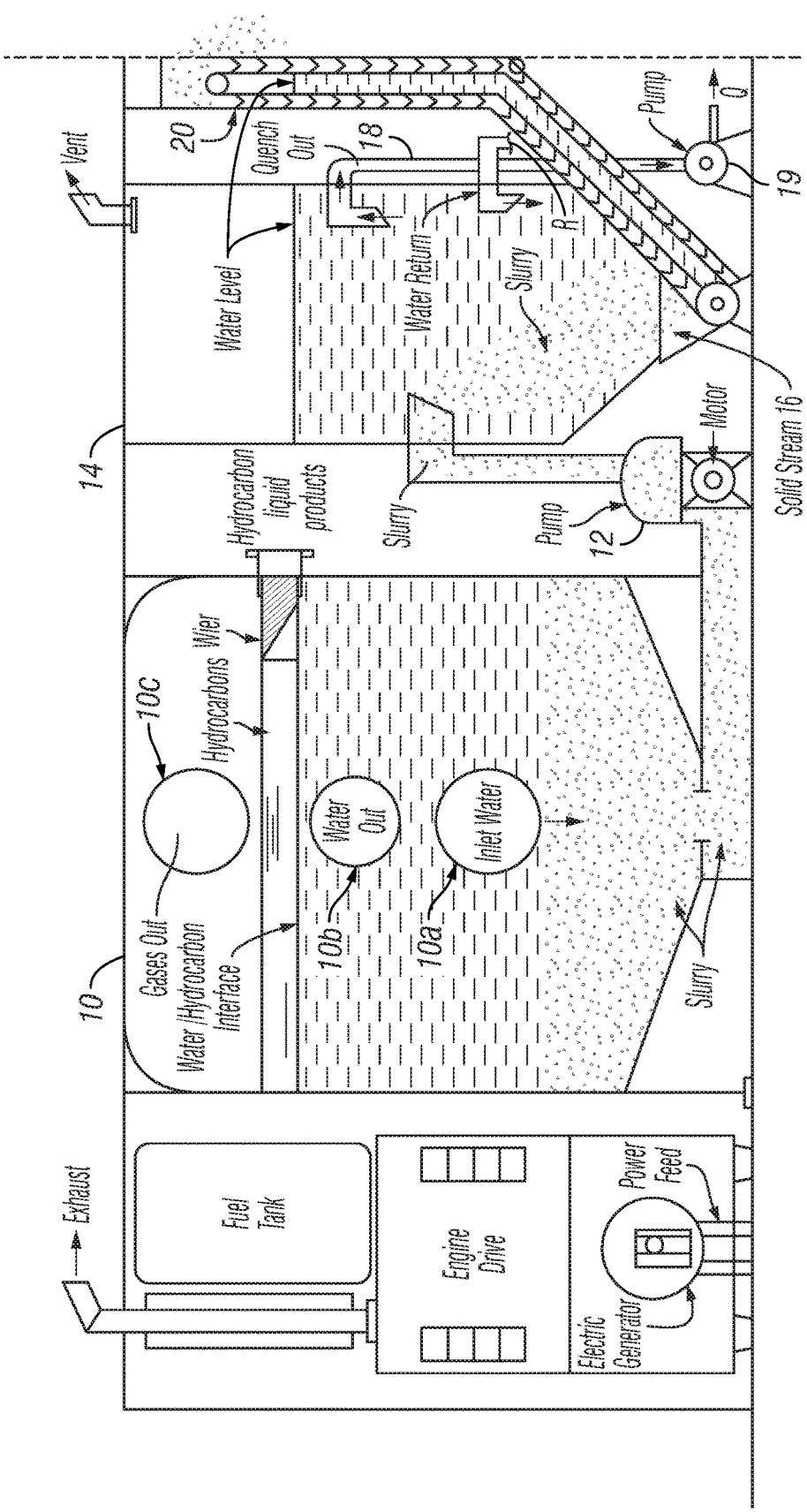
FIG. 2A1

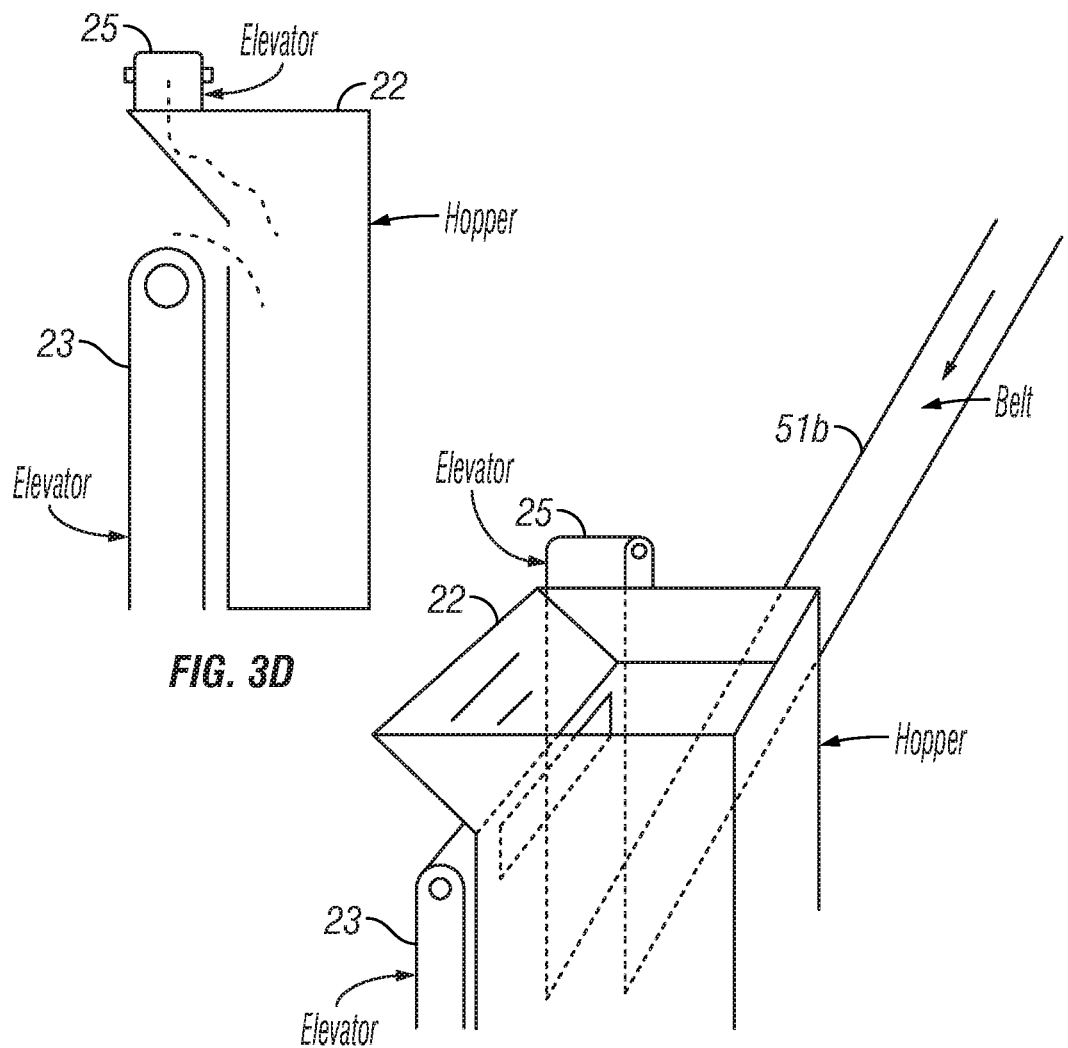

| Nominal Pipe Size | Coils $L_1$ & $L_3$ | Coils $L_2$-Inner & $L_2$-Outer | Tuning Capacitor $C_T$ | Nominal Power Supply Voltage (under load) |
|---|---|---|---|---|
| 3/4" | turns 375<br>wire 20 ga.<br>length 1.9" | turns 250<br>wire 20 ga.<br>length 1.9" | 0.039μf | 11.0V(rms) |
| 1" | turns 375<br>wire 18 ga.<br>length 2.3" | turns 250<br>wire 18 ga.<br>length 2.3" | 0.010μf | 13.0V(rms) |
| 2" | turns 375<br>wire 17 ga.<br>length 3.7" | turns 250<br>wire 17 ga.<br>length 3.7" | 0 | 19.0V(rms) |
| 4" | turns 375<br>wire 16 ga.<br>length 3.55" | turns 250<br>wire 16 ga.<br>length 3.55" | 0 | 33.0V(rms) |
| 6" | turns 375<br>wire 12 ga.<br>length 5.18" | turns 250<br>wire 12 ga.<br>length 5.18" | 0 | 37.0V(rms) |
| 8" | turns 146<br>wire 8 ga.<br>length 8.5" | turns 146<br>wire 8 ga.<br>length 8.5" | 0 | 37.0V(rms) |

FIG. 28

FRACTURE WATER TREATMENT METHOD AND SYSTEM

CROSS-REFERENCE TO RELATED APPLICATIONS

This application is a continuation of U.S. Divisional application Ser. No. 14/338,861, filed Jul. 23, 2014, based on U.S. application Ser. No. 14/095,346, filed Dec. 3, 2013, which is a continuation of U.S. application Ser. No. 13/832,759, filed Mar. 15, 2013, which is a continuation in part of U.S. application Ser. No. 13/594,497 filed Aug. 24, 2012, which claims priority to U.S. Provisional App. No. 61/676,628, filed Jul. 27, 2012. This application also claims priority to all the previously listed applications and also claims priority to U.S. Divisional application Ser. No. 13/753,310, filed on Jan. 29, 2013.

BACKGROUND OF THE INVENTION

This invention concerns the apparatus and processing steps for treating the flow-back and produced water and the other constituents that are used to hydraulically cause the creation of channels or fractures or fissures in hydrocarbon wells (for example, deep oil-shale deposits).

Over the centuries, people have tried different ways to take advantage of and use the inherent qualities of naturally-occurring hydrocarbon compounds to enhance his life style and cope with the many challenges of existence. For over two thousand years, the "Burning Sands" of Kirkuk, in Iraq, provided heat to Kurdish tribes, which came from the methane gas that seeped upwards from deep Geological formations to the Earth's surface only to be ignited and burn continuously to this day. Also the surface seepages of crude oil, in Pennsylvania and California, were used by the American Indians to water-proof the canoes that they used in traveling on the waterways of North America. These are only two early examples of man's utilization of natural gas and crude oil to improve his way of life.

Drake's successful drilling of a shallow crude oil well in Pennsylvania, in the late Nineteenth Century, marked the beginning of man's greatest period of economic growth driven, in great measure, by the rapid strides that were made in the exploration, production, and refining, of naturally-occurring gaseous and liquid hydrocarbon compounds. They are now used for transportation fuels, power generation, lubricants, petrochemicals, and the many thousands of other products and applications that we use in our daily lives today. The birth and development of what we now call "the Oil Industry" is one of the major principal factors and enabling driving forces contributing to the establishment and spectacular growth in the world's economy. This period of economic development is known as "The Industrial Revolution."

During this period, many new oil fields were discovered in many parts of the world and the growth in the demand for crude oil and petroleum products grew at a fantastic rate due to the many new uses for petroleum-derived products that continued to be discovered well into the Twenty-First Century. Throughout this period the Oil Industry found many oil new fields or large deposits or reservoirs of conventionally varying hydrocarbon mixtures of liquid and gaseous compounds (both on land and offshore in the various bodies of water throughout the world). At the same time, the Industry also discovered the existence of large quantities of heavy and light hydrocarbon compound mixtures that were non-conventional in structure and were so enmeshed in the complex material matrixes that the hydrocarbon molecule compounds contained therein could not be extracted economically.

These nonconventional hydrocarbon compound sources fall into two distinctly different categories. Firstly there are the "heavy" or long-chain hydrocarbon molecule compounds such as the oil sands deposits in Canada and the heavy oil deposits in the Kern River or Bellridge regions of California or in the heavy oil belt of the Orinoco river delta region in Venezuela or the Mayan oil in Mexico where the heavy oil produced was extremely viscous and was in a semi-solid state at ambient temperatures. In these cases pour point or viscosity reduction was of primary importance. Secondly there are the "light" or "short-chain" hydrocarbon molecule compounds that are entrapped in various shale deposits throughout the United States and in many other areas in the world.

In certain countries of the world, namely in Spain, Estonia and Brazil there are large, but shallow, oil shale deposits where those countries did not have large reserves or deposits of conventional crude oil. There, a "brute force" method for the extraction of shale oil or kerogen was carried out by heating the shale rock in high temperature pressurized retorts. This practice was started as early as the nineteen twenties. The extracted kerogen or shale oil fuel was then burned in furnaces for heating purposes as well as a transportation fuel for diesel and other internal combustion engines. The extracted kerogen fuel had about the same b.t.u. fuel value and combustion characteristics as regular-grade gasoline or petrol as produced from conventional crude oil refining facilities. Those countries also did not have the necessary amount of hard currency or United States Dollars to buy conventional crude oil on the international commodities market but they did have large volumes of shale rock (although the amount of shale oil or Kerogen extracted from these shale deposits was less than four percent by weight of the shale rock itself, leaving about ninety five percent of the shale rock as waste materials). The hot condensable hydrocarbon compounds were liquefied in a conventional condensing heat exchanger unit and became the kerogen fuel. The non-condensable hydrocarbons, mainly methane, were flared or just released into the atmosphere. All these short-chain or light hydrocarbon compounds are trapped or sealed within the oil shale material matrix structure and when heated, under pressure, they are released or liberated from this matrix in a gaseous phase.

In the United States, there are many areas where oil shale rock deposits are to be found, but most of them are located as deep deposits five to ten thousand feet below the surface of the earth. As early as before the nineteen twenties, many attempts made to mine or extract the kerogen oil from stratified shale formations. Although the shale oil proved to be a very suitable hydrocarbon product, its cost of production was well in excess of the market price of similar products; thus this situation proved to be uneconomical. Additional development and investment was not justified at that time.

All of these factors and conditions have changed dramatically over the past years due, primarily, to the rapid development and exploitation of two specialized technologies. The first of these is the carefully controlled and steerable directional drilling techniques that allowed rigs to be able to initially drill vertically and then be controlled or steered to rotate into a horizontal position while drilling to a predetermined depth. The drilling could then continue to drill well bores horizontally in the shale formation for a considerable distance. The second most important technological development was the application of an old process, namely the practice of hydraulically fracturing older vertical oil wells in order to increase the flow rate as well as to promote the further stimulation of the older, oil wells and thereby extend the economic life of the depleting oil fields.

Over the years many different techniques were developed and implemented in an attempt to extend the productive life of older oil and more mature oil field fields. Water flooding was one of the practices that was employed to maintain reservoir pool pressure in depleting oil fields as well as the injection of pressurized methane gas (when available and not being flared) in order to achieve the same result. Another technique that was tried was the use of "Shaped Charges" of explosives that were strategically placed in well casings so they could be detonated in the pay zone areas in the well bore and the force of these explosions penetrated the wall of the casing and caused fractures or fissures to be opened.

Such methods for EOR (Enhanced Oil Recovery) were the oil industry norm for many years. However some oil companies were concerned about the dangers in using explosives as a means of extending the productive life of depleting oil fields; and, in the late nineteen forties, the practice of using highly-pressured water and sand mixtures to produce fissures or fractures in the pay-zone areas began. This technique was developed to try to increase the rate of flow in the oil well and also to extend the productive life of a mature and depleting oil field without the use of explosives. Opening new channels hydraulically in the older pay zones made it easier for the liquid and gaseous hydrocarbons to flow freely under bottom hole pressure up to the surface for collection as crude oil and gas products.

Also the practice of using work-over rigs to clean out old oil well casings that had restricted hydrocarbon flows due to the accumulation of asphaltic or paraffinic compounds was wide-spread during this period.

The use of all these types of oil well stimulation practices, as well as the use of other enhanced oil recovery techniques, continued over a long period of time and many improvements were developed over the years. One of these improvements was the development of the larger capacity and more powerful barite mud pumps that were needed to assist in the drilling of deeper and deeper oil wells, both onshore as well as offshore. Some of these oil wells were drilled in water depths exceeding eight thousand feet; further drilling depths adding more than twenty thousand feet, and thus there was a need to enlarge the capacity and increase the pressure capability level of the hydraulic fracturing pumps as well.

The discovery of a number of large deposits of oil shale formations, plus the newly developed technologies of steerable directional drilling capabilities, coupled with the ability to use highly pressurized hydraulic fracturing equipment, allowed the industry to proceed with these new fracturing techniques. They were able to directionally drill, both vertically and horizontally, in the deep shale formations and then hydraulically fracture the formation to release the gaseous and liquid hydrocarbons that were contained in the shale matrix material formations. These new technologies have caused an economic "sea change" in how the world now values liquid and gaseous hydrocarbons in the global energy commodities market.

However, during the period when the application of hydraulic fracturing was becoming more wide spread, its growth, technologically and operationally, was carried out in a very haphazard, hit and miss, ad hoc manner. Many of the improvements that were made were the result of unscientifically developed trial and error attempts to improve the rate of production in an oil well as well as trying to extend the economic life of established oil fields. This was all done without the benefit of fully examining or understanding the sound scientific reasons behind the need for those improvements. The best example of this unscientific approach, in trying to solve specific processing problems, is what was occurring in the proper selection and use of various types of proppants in the hydraulic fracturing process.

After the initial pressurized water fracturing is accomplished, strong proppant materials need to remain in the fissures or fractures that are produced by the pressurized water technique if the desired increase in the flow rate of the produced hydrocarbons is to be achieved. Proppants are the selected means of "propping up" the new openings or cracks in the formations, so that they will continue to keep the new fractures or fissures open and to allow the hydrocarbon compounds to flow freely into the well bores so they can be discharged through the well head's control equipment.

Without the proper proppants that are strong enough and correctly sized to keep the fissures continuously open, the well's production rate will decline rapidly as proppant fines and softer material particles fill up the fissures. These will decrease the rate of flow and ultimately block the flow of hydrocarbons into the well bore. Many types of sands having different compositions, shapes and sizes were tested as well as many other types of proppant materials such as aluminum oxides, etc.

The key issue here is that the proper proppant that should be used in a hydraulic fracturing process is the single most important factor that is needed in achieving and maintaining the proper "voids ratio" that is needed in the pressurized water fractured channels to be able to realize the full benefit of the hydraulic fracturing process.

While these considerations are important in hydraulic fracturing in vertically drilled oil welts with selected pay zones, they are far more critical and important when applying the hydraulic fracturing process in horizontally-layered oil shale formations. As a result of the magnitude of the "Shale Gas Revolution" we are now just starting to learn more and understand more about the nature and characteristics of the various types of shale formations.

Oil shale is a form of sedimentary deposits that were laid down eons ago in the form mainly of calcium carbonates, sodium carbonates, calcium bicarbonates, quartz as well as soil materials and other compounds that became entrapped in the matrix of materials as these oil shales were being formed and ultimately deposited in the shale formations that we know about today. Many oil shale formations cross tectonic fault lines in the crust of the earth and thus can be discontinuous in their configuration. Some oil shale formations are slightly inclined in both the vertical and horizontal planes. As a result, wire line tracking as well as three dimensional seismic analyses becomes an important part of the shale gas exploration and development process.

Retrospectively it is important to recognize and stress the critical function that properly structured and sized proppants perform for the optimum extraction and production of gaseous and liquid hydrocarbon compounds which are the product as a result of the hydraulic fracturing of an oil shale deposit. This fact was not fully understood or appreciated, in the oil industry, until early in the twenty-first century. By the end of the twentieth century the Petroleum Industry had already been using the technique of hydraulic fracturing for enhanced oil recovery and oil well stimulation on producing wells for more than fifty years. All of the hydraulic fracturing operations that were carried out before the turn of the twenty first century were designed to extend the productive life of existing vertically drilled oil wells or achieve greater hydrocarbon flow rates for completed wells. All of these hydraulic fracturing operations were carried out in vertically-drilled oil wells and were fracturing pay zones that were essentially sand in composition, and were producing flowing liquid or gaseous hydrocarbons under bottom hole temperature and pressure conditions. All were in sand formations that had relatively high permeability and porosity values or good voids-ratio characteristics.

With the introduction of steerable vertical and horizontal drilling equipment together with very high pressure fracturing pumps (called by some "intensifiers"), the oil industry then applied the same hydraulic fracturing techniques that had been successfully developed and used in vertical oil well hydraulic fracturing operations and applied these same procedures to the well bores that were horizontally drilled in the deep shale formations but with less than satisfactory results. Some of the oil shale formations were more productive than others and a large number of approaches were attempted in order to try to increase the amount of encapsulated hydrocarbons that were released by hydraulic fracturing. Chemicals were added to try to control the growth of the water borne microorganisms that were impeding the flow of hydrocarbons, chemicals were also added in order to control corrosion and encrustations. Surface tension reducing chemicals were also added to try to make the fracturing water more capable of penetrating the fissures that were created by the highly pressured water. Some combination of steps were more successful in one area of oil shale than the same steps being taken and applied in another oil shale formation particularly in the difference in the percentage or amount of hydrocarbon product that was ultimately being extracted from a specific amount of hydrocarbon content in a given oil shale deposit.

It was not until the industry started to realize that the traditional principles of petroleum technology were not fully applicable to the newly developed attempts to extract entrapped liquid and gaseous hydrocarbons from mineral rock formations that did allow them to flow freely even in deep high temperature and high pressure locations. Petroleum engineers then turned to the principles of applying the examination of hard rock mechanics of minerals geology criteria in seeking a comprehensive analysis and understandable answer to these issues. Recently, research efforts proved that all shale formations could be categorized and could be roughly divided in to two distinct measurable and identifiable classifications being either a "soft shale" or a "hard shale." See, e.g. Denney, Dennis. (2012 March). Fracturing-Fluid Effects on Shale and Proppant Embedment. *JPT*. pp. 59-61. The test criteria are based upon the principle of measuring the stress/strain or Young's Modulus value of a given material both before and after fracturing. The test measures the nano indentation of a mineral after applying a specific stress level. Hard shales recorded low nano indentation values while the soft shales tested measured higher indentation values. The hard shales had mainly silica, calcium carbonates, calcites, and quartz in their composition along with colloidal clays; whereas the soft shales had sodium bicarbonates, nahcolites and colloidal clay components.

The ability to accurately determine the true mineral characteristics of an oil shale is very important in selecting the best operational techniques that are needed in order to optimize or maximize the ultimate recovery of hydrocarbon components from a specific shale formation or deposit. Soft oil shale formations respond differently from hard oil shale formations after both have been subjected to the same level of hydraulic water pressure for the same soaking period of time. Hard oil shales, under high hydraulic pressures yield fissures or channels that are relatively short in penetration length and rather small in the cross sectional diameters of their fissures or flow channels. Soft oil shales, on the other hand, under the same high hydraulic pressure and soaking period yield fissures that are of greater length and have cross sectional diameters that are relatively larger than what can be achieved from the hydraulic fracturing of materials in the hard oil shale formations.

Aside from controlling the growth of microorganisms and the prevention of scale encrustations and "slick" water provisions, the most important factor in an operation's ability to extract the maximum or optimum amount of hydrocarbon from a given shale formation is the selection of the proper size and type of proppant that is carried into the fracture zone by the fracturing water. If the shale to be fractured is a hard shale the proppant must be of small enough size so that it can be carried into the small diameter fissures that are the result of the hard shale fracturing operation and strong enough to be able to keep the channel or fissure open long enough in order to allow the contained liquid or gaseous hydrocarbon product to flow freely horizontally and vertically in the well bore so as to be recoverable after being released to the surface facilities. If the proppant used is too large for the small diameter size fissure, the proppant will not penetrate into the fissure and remain there in order to keep the fissure channel open, and the amount of recoverable produced hydrocarbons will be significantly reduced. Alternatively, if an operation is hydraulic fracturing in a soft shale formation the properly sized proppant should be larger in diameter than the proppant that would be suitable for use in a hard shale. This will allow the proppant to be carried into the larger diameter fissures that are the result of the hydraulic fracturing of a soft shale. A smaller size proppant would not be as effective and this would result in a significant reduction in the amount of hydrocarbon product that could be produced.

Now that we have more scientifically measureable data regarding the differences in the various types of oil shale formations the industry now realizes, more clearly, the economic importance of selecting the proper proppant for the hydraulic fracturing of various types of oil shale formations. The best proppant for hydraulically fracturing soft mineral shales we now know is different from the best proppant that we need to use when hydraulically fracturing a hard mineral shale. Thus, there is a need for specific proppants for specific oil shales.

An object of examples of the invention, therefore, is to provide a wide range of properly sized and constituted proppants using virtually all the slurry materials that are carried to the surface and are contained in the flow-back water stream from the hydraulic fracturing of gas and oil formations.

As a result of the rapid increase in the extent and amount of hydraulic fracturing of oil shale deposits being developed in a number of different areas in the United States, there has arisen a number of ecological and environmental concerns that must be addressed if the industry is to grow successfully. For instance toxic chemicals (such as glutaraldehyde) are used as a biocide to kill, control, or eliminate, the water borne micro-organisms that are present in the water used in the hydraulic fracturing process. There is great concern such toxic chemical-bearing fracturing water could migrate into a potable water aquifer. Also of concern is the possibility of friction-reducing chemicals (e.g., polyacrylamide) or scale inhibitors (e.g., phosphonate) finding their way into and contaminating an aquifer. Detergent soap mixtures as well as chemicals such as potassium chloride are commonly used as surface-tension-reducing surfactants and could create public health issues. The current practice of injecting brine-contaminated flow-back water into disposal wells is another of concern to the public.

In some examples of traditional fracturing jobs, after explosively perforating a horizontal well casing, a water mixture is injected at high pressure into a multitude of individually sequenced fracturing zones, each being sealed off at both ends by packer sleeves. This allows the water mixture to remain in the shale formation under pressure for several days, creating channels, fractures, or fissures which, when the hydraulic pressure is released by a coiled drilling operation, allow hydrocarbon gas and liquid elements to have passageways that allow flow to the surface. For each individual fracturing zone, the pressure in the water mixture is reduced in sequence so that the depressurized water flows back horizontally into the well bore and then proceeds upward in the vertical cemented well section to the ground surface elevation. Much of the proppant remains behind in these channels; however, a significant amount comes out in the back-flow water.

The flow-back water volume accounts for less than fifty percent of the amount of injected water used for the fracturing operation. The flow-back water stream also contains materials that are leached out of the shale formation such as bicarbonates, (e.g., nahcolities). The flow-back water mixture also carries with it many volatile organic compounds as well as the micro-organism debris, any dissolved salts or brines, and a significant amount of the initially-injected proppant and their produced fines. Treatment and/or disposal of this flow-back are significant issues for the industry. For example, see Smyth, Julie Carr. (2012). Ohio quakes put pressure on use of fracturing. *Associated Press*. pp. D1, D6, Lowry, Jeff, et al. (2011 December). Haynesville trial well applies environmentally focused shale technologies. *World Oil*. pp. 39-40, 42. Beckwith, Robin. (2010 December). Hydraulic Fracturing The Fuss, The Facts, The Future, *JPT*. pp. 34-35, 38-41. Ditoro, Lod, K. (2011). The Haynesville Shale. *Upstream Pumping Solutions*. pp. 31-33. Walser, Doug. (2011). Hydraulic Fracturing in the Haynesville Shale: What's Different? *Upstream Pumping Solutions*. pp. 34-36. Bybee, Karen. (2011 March). In-Line-Water-Separation Prototype Development and Testing. *JPT*. pp. 84-85. Bybee, Karen. (2011 March), Produced-Water-Volume Estimates and Management Practices. *JPT*. pp. 77-79. Katz, Jonathan. (2012 May). Report: Fracking to Grow U.S. Water-Treatment Market Nine-Fold by 2020. *Industry Week*. U.S. App. Pub. No. 2012/0012307A1; U.S. App. Pub. No. 2012/0024525A1; U.S. App. Pub. No. 2012/0070339A1; U.S. App. Pub. No. 2012/0085236A1; U.S. App. Pub. No. 2012/0097614A1. Each of the above references are incorporated herein by reference for all purposes.

Currently, it is common practice to kill micro-organisms that are in the water mixture, either initially or insitu, by chemical or other types of biocides, so that the gaseous and liquid hydrocarbons that are trapped in the oil shale's matrix formation can flow freely into the channels and fissures vacated by the flow-back water mixture. Also, the channels created by the fracturing process must be kept open by the proppants that are initially carried into the fissures in the fracture zones by the injected water mixture. If the micro-organisms are not killed they will multiply, rapidly; and, if they remain in the fissures, they will grow and reduce or entirely block the flow hydrocarbons from these fissures. Another significant micro-organism type problem is the possible presence of a strain of microbes that have an affinity for seeking out and digesting any free sulfur or sulfur bearing compounds and producing hydrogen sulfides that must be removed from any product gas stream because it is a highly dangerous and carcinogenic material. All these types of micro-organisms must be destroyed if this type of problem is to be avoided.

In addition to the possibility of micro-organisms multiplying and blocking the flow of hydrocarbon product, the presence of dissolved solids in the water solution can also be a problem in the injected water mixture. They can deposit themselves as scale or encrustations in the same flow channels and fissures. These encrustations, if allowed to be deposited in these channels, will also reduce or block the flow of hydrocarbons to the surface. In order to avoid this condition, attempts are made in current industry practice to have the dissolved solids coalesce and attach themselves to the suspended or other colloidal particles present in the water mixture to be removed before injection in the well; however, those efforts are only partly effective. See, e.g. Denny, Dennis. (2012 March). Fracturing-Fluid Effects on Shale and Proppant Embedment, *JPT*. pp. 59-61. Kealser, Vic. (2012 April). Real-Time Field Monitoring to Optimize Microbe Control. *JPT*. pp. 30, 32-33. Lowry, Jeff, et al, (2011 December). Haynesville trial well applies environmentally focused shale technologies. *World Oil*. pp. 39-40, 42. Rassenfoss, Stephen. (2012 April). Companies Strive to Better Understand Shale Wells. *JPT*. pp. 44-48. Ditoro, Lori K. (2011). The Haynesville Shale. *Upstream Pumping Solutions*. pp. 31-33. Walser, Doug. (2011). Hydraulic Fracturing in the Haynesville Shale: What's Different? *Upstream Pumping Solutions*. pp. 34-36. Denney, Dennis. (2012 March). Stimulation Influence on Production in the Haynesville Shale: A Playwide Examination. *JPT*. pp. 62-66. Denney, Dennis. (2011 January). Technology Applications. *JPT*. pp. 20, 22, 26. All of the above are incorporated herein by reference for all purposes.

In recent years, the oil industry has tried to develop a number of ways to address these concerns. The use of ultra violet light in conjunction with reduced amounts of chemical biocide has proven to be only partially effective in killing water borne micro-organisms. This is also true when also trying to use ultra-high frequency sound waves to kill micro-organisms. Both these systems, however, lack the intensity and strength to effectively kill all of the water-borne micro-organisms with only one weak short time residence exposure and with virtually no residual effectiveness. Both systems need some chemical biocides to effectively kill all the water borne micro-organisms that are in water. Also, some companies use low-frequency or low-strength electro-magnetic wave generators as biocide/coalescers; however, these too have proven to be only marginally effective.

Therefore, an object of further examples is to economically address and satisfactorily resolve some of the major environmental concerns that are of industry-wide importance. Objects of still further examples are to eliminate the need for brine disposal wells, eliminate the use of toxic chemicals as biocides for micro-organism destruction, or for scale prevention, and the recovery of all flow-back or produced water for reuse in subsequent hydraulic fracturing operations. Examples of the invention provide technically sound and economically viable solutions to many of the public safety issues that have concerned the industry in hydraulic fracturing.

SUMMARY OF EXAMPLES OF THE INVENTION

Advantages of various examples of the present invention include the need for less (or no) disposal of brine water, since substantially all dissolved salts are coalesced and converted into suspended particles that are separated and incorporated with recovered proppant and fines for inclusion in a teed material for fusion by pyrolysis in a rotary kiln. Similarly, examples of the invention eliminate the need for chemical biocides since the high intensity, variable, ultra-high frequency electromagnetic wave generator kills the micro-organisms that are present in water before water is injected into the formation. The electromagnetic wave also prevents the formation of scale encrustations; therefore, there is no need to add scale inhibitors to the fracturing water mixture. As a result, substantially all the flow-back water from a fracturing operation is reused with all the remaining solid materials being recycled and reconstituted into appropriately-constituted and properly sized proppants for subsequent use in fracturing operations. In addition, since volatile organic compounds are burned and vaporized, there is no need for any sludge or other types of solid waste disposal facilities.

According to one aspect of the invention, a system for use in well fracturing operations is provided, comprising: a first separator including a slurry intake and a slurry output with a first water content; a second separator having a slurry input, positioned to receive slurry from the slurry output of the first separator, and a slurry output with a second, lower water content; a kiln positioned to receive the slurry output of the second separator and having an output; a quench positioned to receive slag from the output of the kiln; a crusher positioned to receive quenched slag from the quench; a mill positioned to receive crushed material from the crusher; a first screen positioned to receive milled material from the mill, the size of the screen wherein the size of the first screen determines the upper boundary of the proppant size; and a second screen positioned to receive material passed by the first screen, wherein the size of the second screen determines the lower boundary of the proppant size. In at least one example, the system further comprises a proppant storage silo positioned to receive proppant from between the first and the second screens. In a further example, the system also includes a blender positioned to receive proppant from the silo. In a more specific example, the first separator includes a water output and the system further includes: a water storage tank positioned to receive water from the first separator, a biocide coalescer positioned to receive water from the water storage tank, the coalescer having an output feeding the blender, and at least one fracture pump receiving at least proppant and water from the blender, wherein the fracturing pump produces flow in water for well fracturing operations.

According to a further example of the invention, a method is provided for creating a proppant of a specific size from a slurry extracted from a fractured hydrocarbon well, the method comprising: separating water from the slurry, resulting in a slurry stream and a liquid stream; mixing the slurry stream with particulate, resulting in a feed material; fusing proppant material in the feed material; quenching the fused proppant material; breaking the fused proppant material; sizing the broken material for the specific size; and mixing broken material that is not of the specific size with the feed material. In some examples of the invention, the method further comprises extracting the slurry from the flow of produced fluid from a hydrocarbon well, wherein the produced fluid includes water and a slurry, wherein the separating of the slurry results in at least two streams, wherein one of the at least two streams comprises a substantially liquid stream of water and another of the at least two streams comprises the slurry. Examples of acceptable means for separating the slurry from a flow of produced fluid from a hydrocarbon well include a conventional three-phase separator.

In at least one example, the mixing comprises: injecting the solid stream into a kiln; and injecting particulate into the kiln, wherein the injection of the particulate changes the viscosity of a slagging material wherein the slagging material comprises the solid stream and the injected particulate. In a further example, the injecting particulate into the kiln is dependent upon the viscosity of the slagging material in the kiln wherein the injecting of the particulate is increased when the slagging material is too viscous for even flow in the kiln. In some examples, the injecting of the particulate is decreased when the slagging material viscosity is so low that the flow rate through the kiln is too fast for fusing of proppant material.

In a further example, the quenching comprises spraying the fused proppant material with the liquid stream and the breaking comprises: crushing the quenched proppant material and grinding the crushed proppant material.

In still another example the sizing comprises screening and/or weight-separating.

In some examples, the fusing comprises heating the slagging material wherein volatile components in the slagging material are released in a gas phase and proppant material in the slagging material is fused. In some such examples, the rate of flow of the fused material outputting a kiln is measured, and the heating in the kiln is adjusted, based on the measuring.

In yet another example, the method further includes separating the slurry from a flow of produced fluid from a hydrocarbon well, wherein the produced fluid includes water and solids, wherein said separating the slurry results in at least two streams, and wherein one of the at least two streams comprises a substantially liquid stream of water and another of the at least two streams comprises the slurry. In at least one such example, the method also includes imparting an electromagnetic pulse to the substantially liquid stream of water, wherein proppant is mixed with the substantially liquid stream of water before or after the imparting.

According to a further aspect of the of the invention, a system is provided for creating a range of proppant of specific sizes from a slurry extracted from a fractured hydrocarbon well, the system comprising: means for separating water from the slurry, resulting in a slurry stream and a liquid stream; means for mixing the slurry stream with particulate, resulting in a feed material; means for fusing proppant material in the feed material; means for quenching the fused proppant material; means for breaking the fused proppant material; means for sizing the broken material for the specific size; and means for mixing broken material that is not of the specific size with the feed material. In at least one example, the means for mixing broken material that is not of the specific size comprises the means for fusing.

An example of the means for separating includes at two-phase separation tank with a funnel at a lower end with a conduit leading to the input to an auger. A two-phase separation tank uses the principle of gravity-precipitating unit (with or without baffles). An alternative to a gravity-precipitation unit is a pressurized tank from a hydrocone system forcing slurry to a feed-hopper with an auger.

In a further example, the means for mixing the slurry stream with particulate comprises: means for injecting the slurry stream into a kiln; and means for injecting particulate into the kiln, wherein the injection of the particulate changes the viscosity of a slagging material and wherein the slagging material comprises the slurry stream and the injected particulate. One example of useful a means for injecting the slurry stream into the kiln include: an auger from the means for separating to a kiln feed-hopper. As the auger advances the slurry stream toward the hopper more water comes off. Alternatives include a flight conveyor belt, a bucket conveying system, and others that will occur to those of skill in the art. Specific examples of useful means for injecting sand into the kiln include: a bucket-elevator conveyor with a variable drive bringing particulate e.g. sand) from a silo where the specified sand resides. The variable drive allows changing of the amount of sand depending on the temperature measured at the exit of the kiln. The temperature is related to viscosity. For example, as temperature varies around some set point of about 2200 F, feed of sand will be increased as temperature drops. It will be decreased as temperature rises. In a more specific example, no change will be made for a variation of about 5%, while, over 5%, the amount of variation will cause increase or decrease in an amount that is dependent on the particular kiln, proppant solid feed, and other conditions that will occur to those of skill in the art. Other examples of means for injecting include a belt conveyor or flight conveyor and other equivalents that will occur to those of skill in the art.

In a further example, the means for quenching comprises means for spraying the fused proppant material with the liquid stream that was separated from the slurry (e.g., with nozzles and/or a water wall). A further alternative for cooling the material would be air quenching. In at least one example, the hot solids mixture from a kiln is deposited onto a moving, perforated steel conveyor belt, which is placed over a water collection pan. Water is applied to the mixture while on the belt.

In still a further example, the means for breaking comprises: means for crushing the quenched proppant material; and means for grinding the crushed proppant material. In one such example, the means for crushing comprises a crusher having the following specifications: an eccentric gyratory crusher (conical) so that the crushing space can be varied to obtain various sizes. Alternative crushers include: jaw crushers, roller crushers, ball crushers, and other equivalents that will occur to those of skill in the art. In some examples, the crusher reduces a solidified, agglomerated mixture into pieces having a size range of about ¼ inch to about ½ inch.

In some examples, the means for grinding comprises a grinder of the following type: a rod mill, a ball mill, an autogenous mill, bowl mill, and other equivalents that will occur to those of skill in the art. In at least some such examples, crushed material is moved by conveyor and discharged into a mixing/grinding unit where the materials are reduced in size, in at least one example, 98-99% of the material passes through a #30 sleeve opening of about 590 microns, and the passes material is similar in size and strength to sharp, fine sand.

In some examples, the means for sizing comprises a screener having at least one screen. An example of a screener that is acceptable is a vibrating screen. If the material passes the screen, it is classified as "specification size." If it is too small, it drops out to an undersized feed that is fed back to the input of the hopper of the kiln. If it is too large, it is separated into an oversized feed that is provided to the hopper at the input of the kiln. In at least one example, the over and undersized streams are combined before they are injected into the kiln. Other acceptable means for sizing includes fixed screens, rotating screens, and means for weight-separating (e.g., a cyclone through which broken material passes and/or specific gravity separation in liquid solution). Examples of acceptable cyclones will occur to those of skill in the art. Another acceptable means for separating includes specific gravity separation in liquid solution Acceptable separation systems of that type will occur to those of skill in the art.

According to a further example, the means for fusing comprises means for heating the slagging material wherein volatile components in the slagging material are released in a gas phase and proppant material in the slagging material is fused. One example of such a means for heating the slagging material includes a slagging rotary kiln, an inclined rotary kiln, and a horizontal kiln with both direct and indirect firing capabilities. Alternative means for fusing proppant material in the feed material include: a non-slagging kiln, a vertical furnace (e.g. a Hershoff furnace, a Pacific, multi-hearth, vertical furnace), a horizontal traveling grate sintering furnace, and other equivalents that will occur to those of skill in the art. In some examples, the kiln operation involves feeding the slurry materials into the kiln and adding proppant to start the process of fusing the slurry material and proppant together into a flowing agglomerate material mass. As the mixture moves down to the kiln discharge port, the temperature of the mixture increases due to the heat being generated by the kiln's burner. At the same time, the viscosity of the mixture decreases as the temperature increases. During this same period of time, the organic materials which are carried in the mixture are burned, vaporized, and discharged into a vent stack, leaving a flowing solids material mixture. The viscosity of this flowing mixture is adjusted by either increasing or decreasing the heat released by the kiln's burner, or by adding more or less proppant to the mixture, or both.

Some examples of the invention also include means for measuring the rate of flow of the fused material outputting the kiln. Examples of means for measuring the flow of the fused material outputting the kiln includes a temperature sensor providing a signal. Other equivalent means will occur to those of skill in the art. A means for adjusting the heating in the kiln based on the measuring is provided in still other embodiments. Examples of means for adjusting the heating in the kiln based on the measuring include: changing the flow of proppant input into the kiln, based on the temperature measurement, and changing the rate of fuel flow to the kiln burner to increase or decrease the amount of heat being released in the kiln.

As mentioned above, the separating of the slurry from the flow from a well results in at least two streams, wherein one of the at least two streams comprises a substantially liquid stream of water. And, in a still more detailed example, a means for imparting an electromagnetic pulse to the substantially liquid stream of water is provided. At least one example of a means for imparting an electromagnetic pulse to the substantially liquid stream of water is disclosed in U.S. Pat. No. 6,063,267, incorporated herein by reference for all purposes. Alternatives to the device described in that patent for use in various examples of the present invention include: traditional biocide/coalescers (chemical, electrical, and mechanical) as will occur to those of skill in the art.

In at least one example, the specific pulse imparted has the following characteristics: variable, ultra-high frequencies in the range of between about 10 and 80 kHz. Other pulses having sufficient frequency to kill the micro-organisms present in water and to cause dissolved solids to coalesce will occur to those of skill in the art and may depend on the specific properties of the water at a particular well. The pulse will generally rupture the cells of the micro-organisms.

In still a further example of the invention, a means for mixing proppant with the substantially liquid stream of water is provided (for mixing either before or after the imparting). Examples of means for mixing proppant with water included a blender as will occur to those of skill in the art (for example, a screen or open, grated tank). In some examples, surface tension reducing agents are also added in the blender, as are other components that will occur to those of skill in the art. The mixture is then provided to a means of increasing the pressure of the mixture (e.g., a fracturing pump—aka "intensifier unit"—as will occur to those of skill in the art) and the pressurized mixture is injected into a well.

In still further examples, proppant is made to specific sizes from produced and/or flow-back water, as well as other sources, using a combination of a kiln, crusher, mill, and screens, to produce proppant of various sizes that those of skill in the art will recognize as being desirable in fracturing operations. See, e.g., Mining Engineering, "Industrial Materials", pp. 59-61, June 2012 (www.miningengineering magazine.com), incorporated herein by reference. The various sizes are made by adjusting the mill and screens used.

In still another example, a method is provided for treating hydrocarbon well fracture water (which includes both "flow back" and "produced" water) from a hydrocarbon well, wherein the method comprises: separating solids from fracture water, wherein a flow of water with suspended solids results; separating the flow of water into a plurality of flows of water; generating positive charge in the plurality of flows of water, wherein a plurality of flows of positively-charged water results; comingling the plurality of flows of positively-charged water after said generating. In a further example, the method also comprises: monitoring an oil/water interface level and controlling the oil/water interface level in the separator.

In a more specific example, method further comprises slowing the flow rate in the plurality of flows of water to be less than the flow rate of the flow of water with suspended solids. Slowing the flow rate allows for greater residence time during the step of generating positive charge. That increases the amount of positive charge in the water which is considered to be beneficial for killing microbes in the water and for providing residual positive charge for a period of time when the water has been injected into a geologic formation from which hydrocarbons are to be produced. The presence of positive charge in the water geologic formation is believed to have benefits in reducing the presence of various flow-reducing structures in the formation.

In a further specific example the method generating positive charge in the flows of water comprises treating each of the plurality of flows of water with electromagnetic flux.

In still a further example, the majority of the suspended solids are less than about 100 microns. In some such examples, substantially all the suspended solids are less than about 100 microns. In a more limited set of examples, the majority of the suspended solids are less than about 10 microns. And in still a more limited set of examples, substantially all the suspended solids are less than about 10 microns. By reducing the size of the suspended solids, it becomes possible to pass the water through devices that are practical for generating positive charge in the water at a reasonable cost by using, for example, stainless steel conduits when the suspended solids approach 100 microns and softer materials (for example, PVC) as the solids approach 10 microns and smaller.

And some further examples, the separating comprises two-stage separating. In at least one such example, two-stage separating comprises: passing the fracture water through a three-phase separator, wherein a water output from the three-phase separator results, and passing the water output from the three-phase separator through a two-phase separator. In at least one such method, the three-phase separator comprises a four-material separator having at least four outputs including: a slurry, water having suspended solids therein, hydrocarbon liquid, and hydrocarbon gas.

According to another example of the invention, a system is provided for treating hydrocarbon well fracture water from a hydrocarbon well, system comprising: means for separating solids from fracture water, wherein a flow of water with suspended solids results; means for separating the flow of water into a plurality of flows of water; means for generating positive charge in the plurality of flows of water, wherein a plurality of flows of positively-charged water results; and means for comingling plurality of flows of positively-charged water.

In at least one such system, the means for separating comprises a three-phase, four material separator. For example, and a more specific example, the means for separating further comprises a second two phase separator, the two-phase separator comprising an input for receiving water flow from the three-phase gas oil separator, and an output for the flow of water with suspended solids. In a further example, there is also provided: means for monitoring an oil/water interface level; and means for controlling the oil/water interface level in the first and second separator. In one such example, the means for monitoring comprises an oil/water interface level indicator and control valve sensor (for example, a cascade control system).

In some examples, the means for separating the flow of water into a plurality of flows of water comprises a manifold having an input port to receive the flow of water with suspended solids and a plurality of output ports, each of which has a cross-sectional area that is smaller than the cross-sectional area of the input of the manifold; and wherein the sum of the cross-sectional areas of the output ports is greater than the cross-sectional area of the input ports, whereby the flow rate exiting the manifold is less than the flow rate entering the manifold. In at least one example, the manifold comprises a 1:12 manifold (for example, having cross-sectional diameters of 4 inches in the output ports and a larger cross sectional diameter in the input ports). In an alternative example, the means for separating the flow of water into a plurality of flows of water comprises a water truck having a plurality of compartments, each compartment being positioned to receive a portion of the flow of water.

In a further example, the means for generating positive charge comprises means for treating each of the plurality of flows of water with electromagnetic flux. At least one such example, the means for treating each of the plurality of flows of water with electromagnetic flux comprises: a pipe; and at least one electrical coil having an axis substantially coaxial with the pipe. In some such examples, the pipe consists essentially of non-conducting material. In some such examples, the pipe consists essentially of stainless steel. In a variety of examples, there is also provided a ringing current switching circuit connected to the coil. In some such examples, the ringing current switching circuit operates in a full-wave mode at a frequency between about 10 kHz to about 80 kHz.

In still a further example, the means for co-mingling comprises a manifold having input ports for a plurality of flows of positively-charged water and an output port. In one such example, the means for co-mingling further comprises a well fracturing water and proppant blender. In a variety of examples, the majority of the suspended solids are less than about 100 microns. In some such examples substantially all the suspended solids are less than about 100 microns. In a more limited set of examples, the majority of the suspended solids are less than about 10 microns. In an even more limited set of examples, substantially all the suspended solids are less than about 10 microns.

In a more specific example, the means for separating comprises a two-stage separator. In one such example, the two-stage separator comprises: a three-phase separator having a water output coupled to an input of a two-phase separator. In a further example, three-phase separator comprises a four-material separator having at least four outputs including: a slurry, water having suspended solids therein, hydrocarbon liquid, and hydrocarbon gas.

In another example of the invention, a system is provided for treatment of hydrocarbon well fracture water, the system comprising: a multi-phase separator; a manifold having an input port connected to an output of the multiphase separator and having multiple output ports; a plurality of pipes, each having coils wound on the pipe, wherein each pipe has an input end connected to an output port of the manifold and each pipe has an output end; a co-mingling manifold having input ports connected to the output ends of the plurality of pipes.

In at least one such system, a proppant-water blender is also provided that is connected to an output of the co-mingling manifold.

In at least one such system, the multi-phase separator comprises a multi-stage separator. In a more specific example, the multi-stage separator comprises a two-stage separator, wherein: a first stage of the two-stage separator comprises a three-phase separator and a second stage of the two-stage separator comprises a two-phase separator. In an even more specific example, the three-phase separator comprises a four-material separator including an oil-water interface control system.

In still another example of the invention, a method is provided for controlling of water/liquid hydrocarbon interface in a three-phase separator, the method comprising: establishing a water/liquid hydrocarbon interface in a three-phase separator; measuring the water/liquid hydrocarbon interface in the three-phase separator, wherein a water/liquid hydrocarbon interface measurement signal results; comparing the water/liquid hydrocarbon interface measurement signal to a set point, wherein a comparison signal results; reducing the flow-back or produced water into the three-phase separator of hydrocarbon well fracture water when the comparison signal indicates the water/liquid hydrocarbon interface is above the set point; and increasing flow into the three-phase separator when the comparison signal indicates the water/liquid hydrocarbon interface is below the set point, wherein the increasing flow comprises hydrocarbon well fracture water from a well and make-up water from a storage tank or a lagoon.

In a further example, the method also comprises: decreasing the flow exiting the three-phase separator at the same rate in balance with the flow as it decreases into the three-phase separator, and increasing the flow exiting the three-phase separator at the same balanced rate as the flow increases into the three-phase separator.

In another example, a system is provided for controlling of water/liquid hydrocarbon interface in the three-phase separator, where in the system comprises: means for establishing a water/liquid hydrocarbon interface in a three-phase separator; means for measuring the water/liquid hydrocarbon interface in the three-phase separator, wherein a water/liquid hydrocarbon interface measurement signal results; means for comparing the water/liquid hydrocarbon interface measurement signal to a set point, wherein a comparison signal results; means for reducing the flow into the three-phase separator of hydrocarbon well fracture water when the comparison signal indicates the water/liquid hydrocarbon interface is above the set point and for increasing flow into the three-phase separator when the comparison signal indicates the water/liquid hydrocarbon interface is below the set point, wherein the increasing flow comprises hydrocarbon well fracture water and make-up water.

In at least one example, the means for establishing a water/liquid hydrocarbon interface comprises a diaphragm wier. In a further example, the means for measuring the water/liquid hydrocarbon interface comprises a liquid level indicator controller-type sensor. In still a further example, comparing the water/liquid hydrocarbon interface measurement signal to a set point comprises a continuous capacitance level transmitter.

In some examples, the means for reducing and for increasing the flow into the three-phase separator comprises a turbine type flow meter and an inlet type control valve in-line with the input of the three-phase separator.

In further examples, also provided are: means for decreasing and balancing the flow exiting the three-phase separator at the same rate as the flow decreases into the three-phase separator and for increasing the flow exiting the three-phase separator at the same balanced rate as the flow increases into the three-phase separator.

In at least one such example the means for decreasing and increasing the flow exiting the three-phase separator comprises a flow-type meter connected in-line with the water output of the three-phase separator. In another example, the means for decreasing and increasing the flow exiting the three-phase separator comprises an orifice-type flow controller controlling the water output of the three-phase separator.

Examples of the inventions are further illustrated in the attached drawings, which are illustrations and not intended as engineering or assembly drawings and are not to scale. Various components are represented symbolically; also, in various places, "windows" into components illustrate the flow of material from one location to another. However, those of skill in the art will understand which components are normally closed. Nothing in the drawings or detailed description should be interpreted as a limitation of any claim term to mean something other than its ordinary meaning to a person of skill in the various technologies brought together in this description.

DESCRIPTION OF THE DRAWINGS

FIG. 2A1 is an alternative to the embodiment of FIG. 2A.

FIGS. 3C and 3D are an isometric and side view, respectively, of an aspect of the examples of FIGS. 2A-2B and FIGS. 3A-3B.

FIG. 28 is a chart specifying presently preferred values of certain parameters of the apparatus of FIGS. 19 to 24.

DETAILED DESCRIPTION OF EXAMPLES OF THE INVENTION

Figure 1:
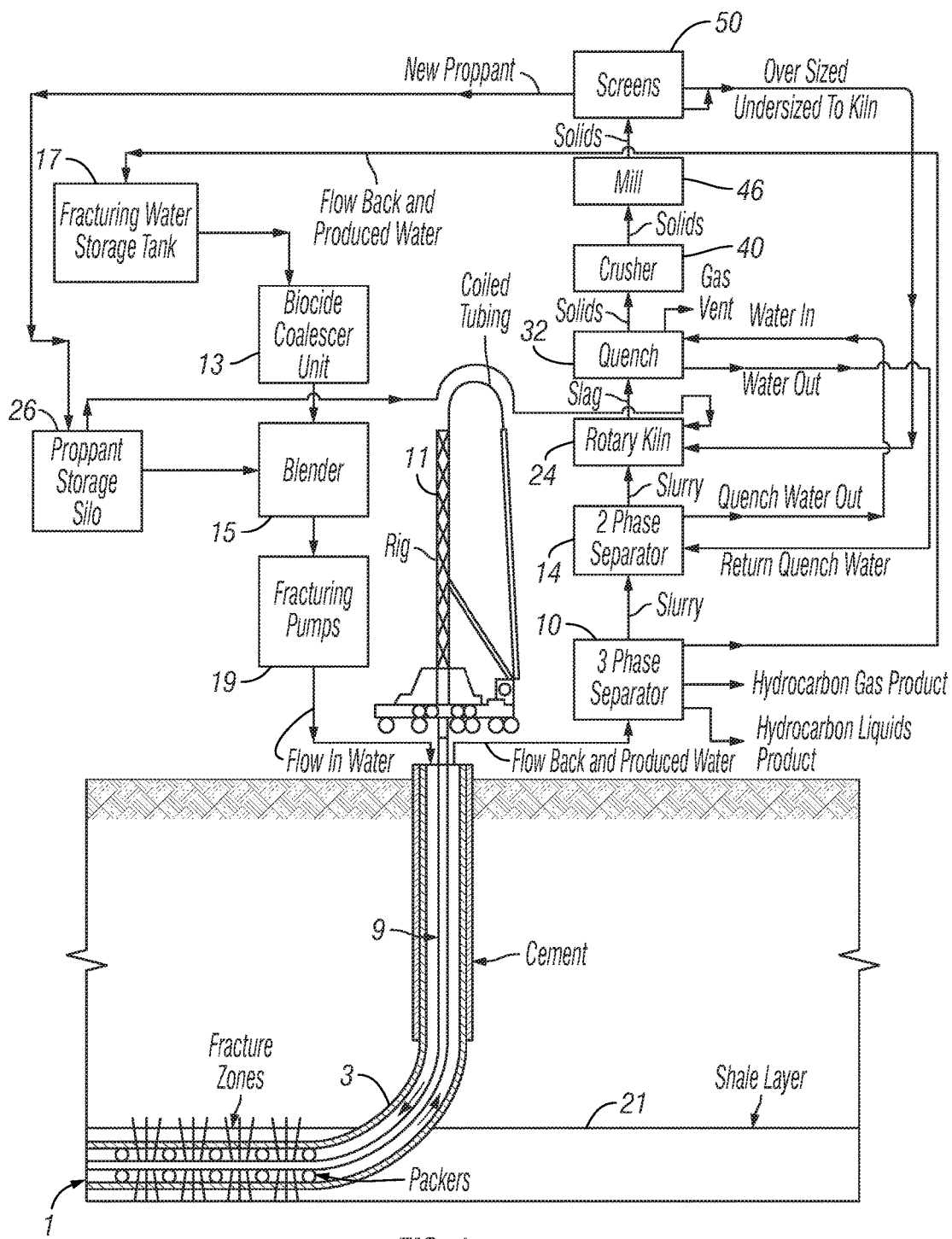
FIG. 1 is a diagram of a well site showing the flow of various materials used in various examples of the invention.

Referring now to FIG. 1, a flow diagram of the use of the invention in a hydrocarbon well having a well bore 1 with cemented casing 3 passing through fracture zones that are isolated by packers. Coil tubing 9 is inserted by rig 11 for fracture operations known to those of skill in the art.

Flow back (and/or produced) water is routed to three-phase solids/liquids/gas/hydrocarbon/water separator 10, from which any hydrocarbon liquids and gases are produced, and water from separator 10 is routed to a fracturing-water storage tank 17 which may also include water from another source (aka "make up" water). Wet solids are passed from three-phase separator 10 to two-phase separator 14, which produces water that is passed to a quench system 32 and slurry that are passed to kiln 24. Slag is passed from kiln 24 through quench system 32 to crusher 40 and then to mill 46. Milled material is separated into a specified size at screen 50 that is sent to a proppant storage silo 26, which may also include proppant from another source (e.g., a supplier of sand). Water is provided to biocide/coalescer unit 13. Proppant provided to blender 15 from silo 26, water is supplied to blender 15 from biocide/coalescer unit 13; the blended water and proppant are then provided to fracturing pumps 19, which pumps the blend into the well where it fractures the oil shale layer 21. Other additives may be provided to the blender 15, as desired. Also, proppant may be added to the water before the biocide/coalescer unit 13 in alternative examples.

Examples of the invention create a range of proppants of specific sizes from a slurry extracted from a hydraulically-fractured hydrocarbon well.

Figure 2A:
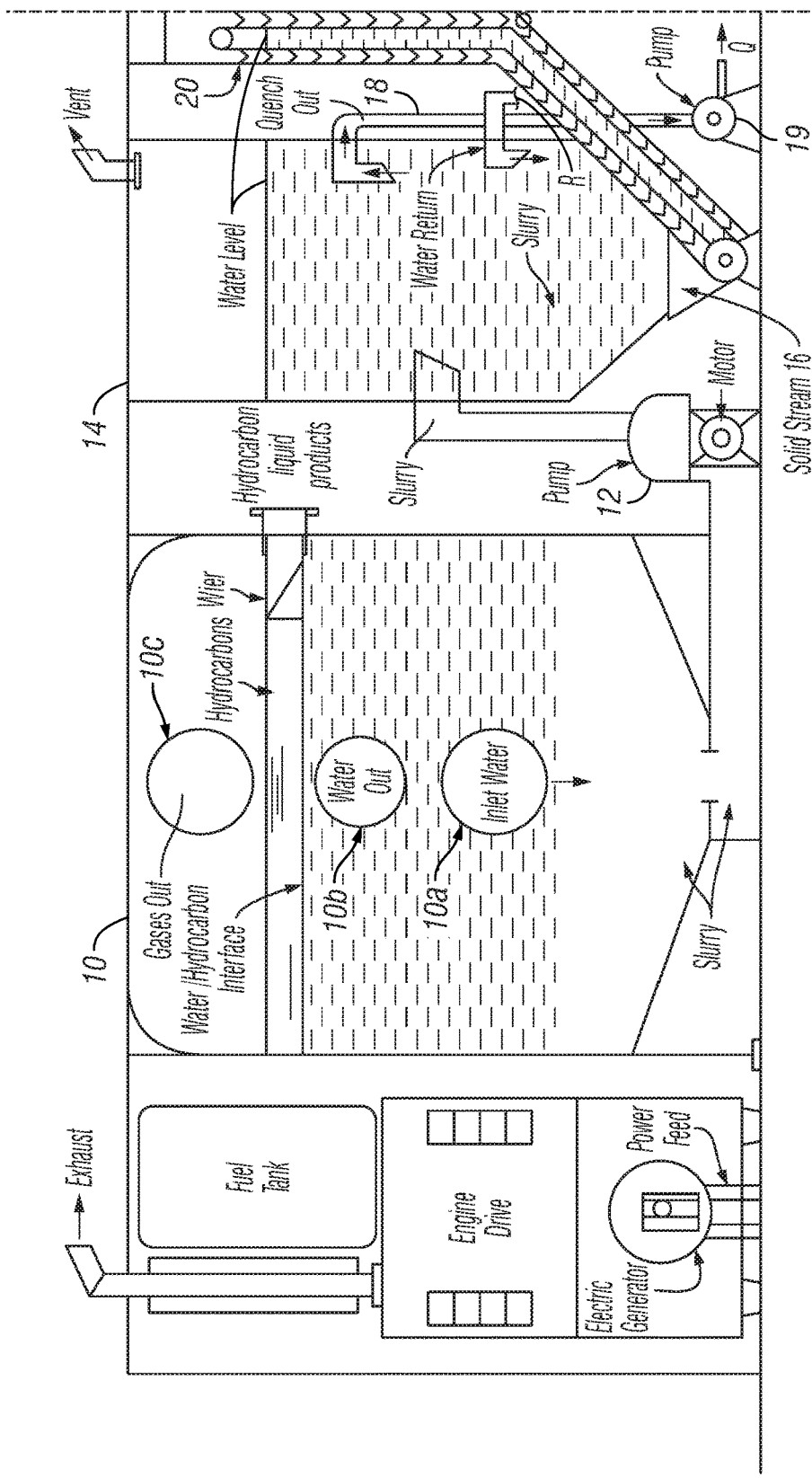
FIGS. 2A and 2B, when connected along respective dotted lines, are a side view of an example of the invention.
Figure 2B:
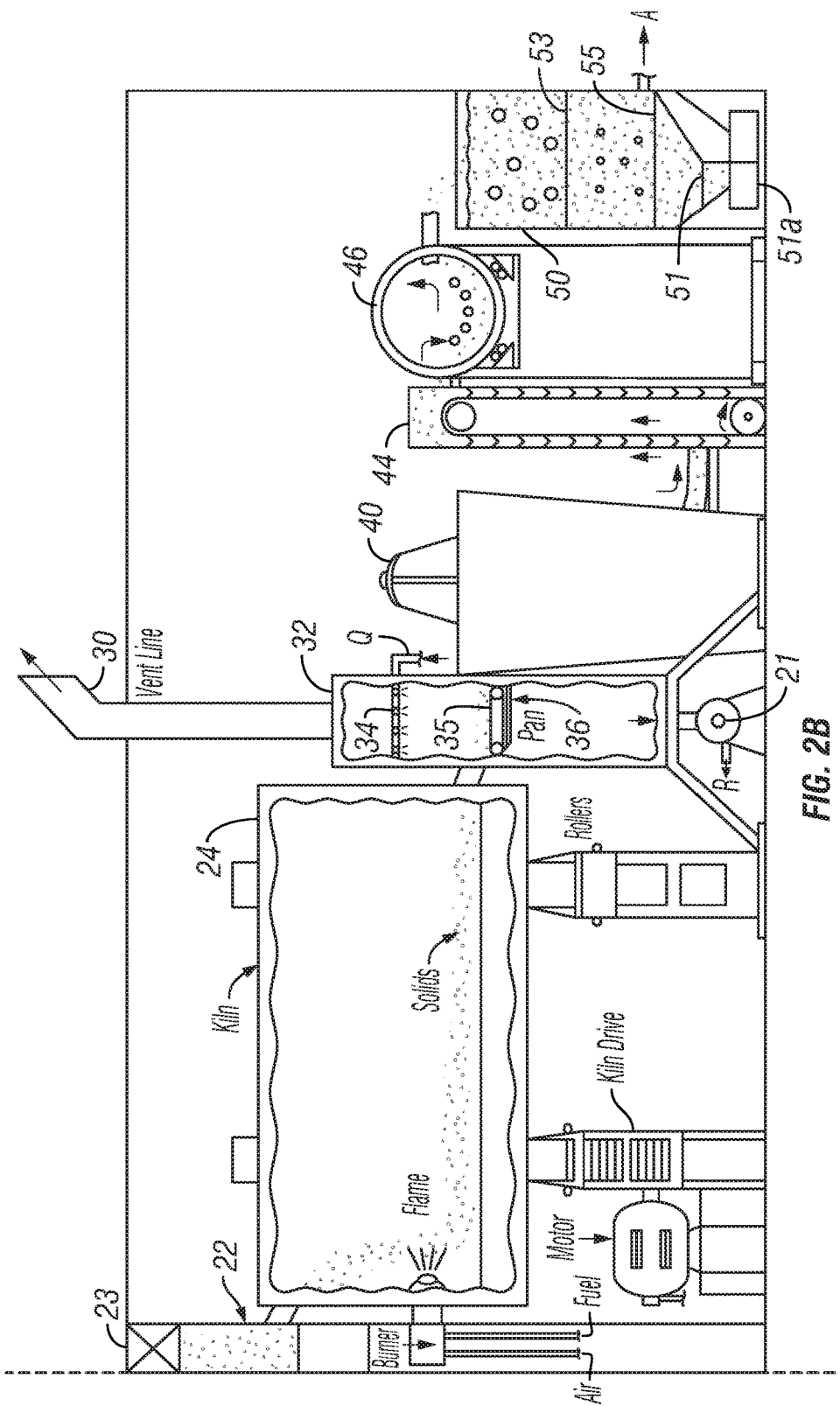
Figure 2C:
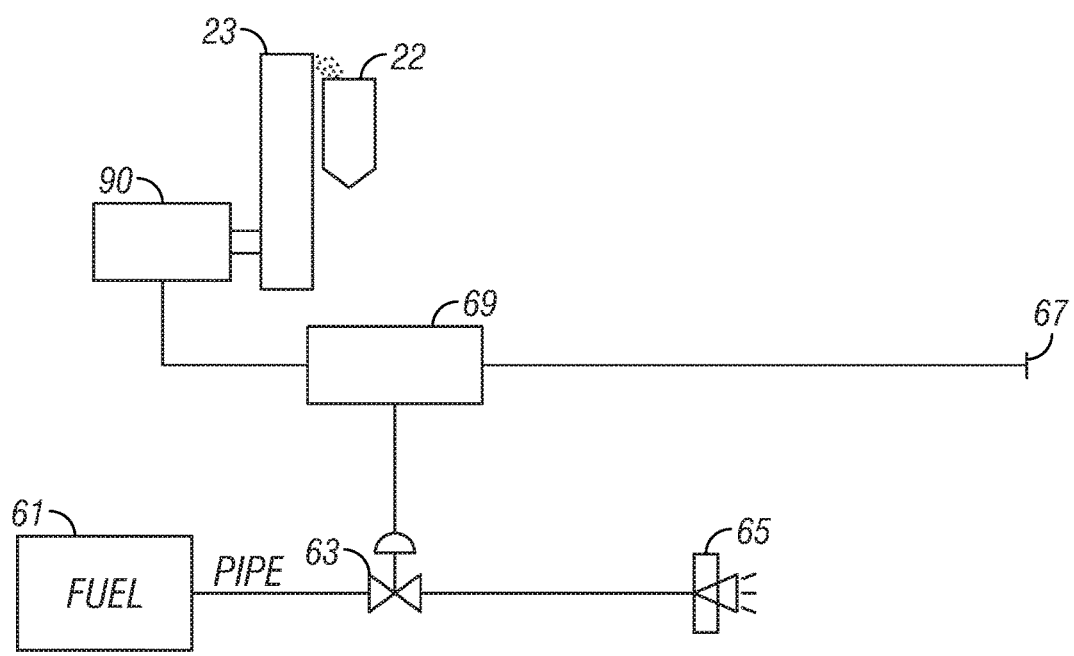
FIG. 2C is a schematic of a control system used in at least one example of the invention.

In FIGS. 2A and 2C and in FIGS. 3A-3D, a more specific example is seen. In that example, a slurry is extracted from gravity-precipitated slurry that accumulates at the bottom of a conventional three-phase separation tank 10 (which is of a common design known to those of skill in the art). In the specific example of FIG. 2A, as will occur to those of skill in the an, a water/liquid hydrocarbon interface level facilitates the separation and recovery of any liquid hydrocarbon product from the flow back or produced water stream (which is under pressure as it enters separator 10) by means of an internally or externally mounted water level indicator (not shown). That indicator sends a water level measurement signal to a pre-programmed, low level/high level water flow control data integrator (not shown). When the water level in the separator 10 reaches the high level set point, the data integrator actuates a control valve (not shown) that controls flow through the water feed pipe 10a (labeled "Inlet Water") to reduce the amount of water going into the three phase separator, and the rate of flow continues to decrease until a point is reached where the incoming amount of water equalizes and balances out the volume of water being withdrawn from the three phase separator. Conversely, if the water level in the three phase separator 10 falls below the low level set point, the data integrator actuates and further opens up the control valve in inlet pipe 10a in order to increase the amount or rate of water flow that is sufficient to stabilize the interface level. If this additional amount of water is not sufficient to stabilize the water level at the interface level, the integrator actuates a pump (not shown) and opens up another control valve (not shown) which is located in a discharge pipe (not shown) in water storage tank 17 (FIG. 1). That discharge pipe is connected to the inlet pipe 10a; thus water from fracturing water storage tank 17 continues to flow into the three phase separator together with the flow back or produced water until the water level in the separator 10 reaches the proper interface level. Then, the make-up water control valve closes and the make-up water pump is shut off. This control sequence is necessary in order to achieve steady state and continuous operational stability in the separation and recovery of any liquid hydrocarbon product that is carried into the three phase separator by the flow back or produced water feed stream.

A weir and baffle configuration (commonly known in gas/oil separation units) facilitates the separation and recovery of the liquid hydrocarbon product, if any, by using the interface level as the maximum height of the water in the separator and allowing the lighter liquid hydrocarbons to float on top of the water layer and then be withdrawn as liquid hydrocarbon product after it flows over the liquid hydrocarbon product weir and is withdrawn at the hydrocarbon liquid product outlet flange connection. A horizontal baffle under the weir limits the amount of potential water carry over that might be comingled with the liquid hydrocarbon product stream. As the flow back or produced water stream enters the three phase separator 10 the depressurization releases the lighter hydrocarbon gases and their release assists in the flotation of the liquid hydrocarbon products as well as the release of the gaseous hydrocarbon products through outlet 10c. Water flows out of separator 10 through pipe 10b to a surge tank (not shown) and is then pumped back to water tank 17 (FIG. 1).

From separator 10, a motor-driven positive displacement diaphragm-type sludge pump 12 moves the slurry upwards to the inlet opening of a two-phase water/solids separation tank 14 resulting in a solid stream 16 and a liquid stream 18 that is pumped by pump 19 to a quench (labeled "Q"). From the bottom of the two-phase water/solids separation tank 14, a bucket-elevator conveyor 20 transports the precipitated slurry materials from the lower part of the water/solids separation tank 14 upwards from the water level and discharges them into the feed-hopper 22 (FIG. 2B). The discharge is seen in FIG. 2A as going over a dashed line, which connects with the dashed line to the left of FIG. 2B where slurry is seen accumulating in feed-hopper 22 of a slagging, rotary-kiln 24, leaving the slurry water to remain in the water/solids separation tank 14 and the elevator 20. As a result, all separation is carried out at atmospheric pressure rather than in pressurized-vessels (as is current practice).

In the feed-hopper 22, the slurry materials from the water/slurry separation tank are mixed with specification proppant from silo 26 (FIG. 1), as well as under-sized and over-sized solid materials that come from a final screening unit 50 (described below).

As the fusion process for the proppant material proceeds, inorganic proppant materials are fused into a uniform mass and volatile organic materials that may have been present in the feed stream from the water/solids separation tank 14 are burned and vaporized prior to the gases being eventually discharged into an exhaust vent 30.

The proppant material exiting from the rotary kiln 24 is quenched with a stream of water to reduce the temperature of the material, as it emerges from the outlet of the kiln 24. In some examples, discharged material flows onto a perforated, motor-driven stainless-steel conveyor belt 35 and the water cascades, through spray nozzles 34 on to the moving belt 35 thereby solidifying and cooling the proppant material. The water used for quenching the proppant material comes from the water/solids separation tank 14 (see FIG. 2A) using, e.g., a motor-driven centrifugal pump 19 to push the water to the quench nozzles 34 of FIG. 3B. An excess water collection pan 36 is positioned under the conveyor belt 35 to collect and recover any excess quench water and convey it back to the water/solids separation tank 14 by a motor-driven centrifugal pump 21 and a pipeline shown flowing to return "R" of FIG. 2A.

Quenching the hot proppant material, as it is discharged from the kiln 24, causes a multitude of random, differential-temperature fractures or cracks due to the uneven contraction of the proppant material and the high internal stresses caused by rapid quenching. The different sized pieces of proppant material are discharged directly into the material crusher 40.

Crushing or breaking up the large irregular pieces of proppant material and reducing their size is accomplished, in some examples, by a motor-driven, vertical-shaft, gyratory, eccentric cone or jaw crusher, known to those of skill in the art. The degree of the size reduction is adjusted by changing the spacing or crusher gap, thus allowing a range of different material sizes to be produced, as is known to those of skill in the art.

Sizing of the proppant material is accomplished by the grinding or milling of the crushed proppant material after the proppant material is discharged at the bottom of the crusher. In the illustrated example, the material is conveyed upwards to ball mill 46 by a bucket-elevator conveyor 44. In at least one alternative example, a rod mill is used. The mill 46 is adjusted to grind the proppant material to different specific size ranges by changing rotation, the size and spacing of the rods or balls in the mill 46 (or its rotation).

Figure 3A:
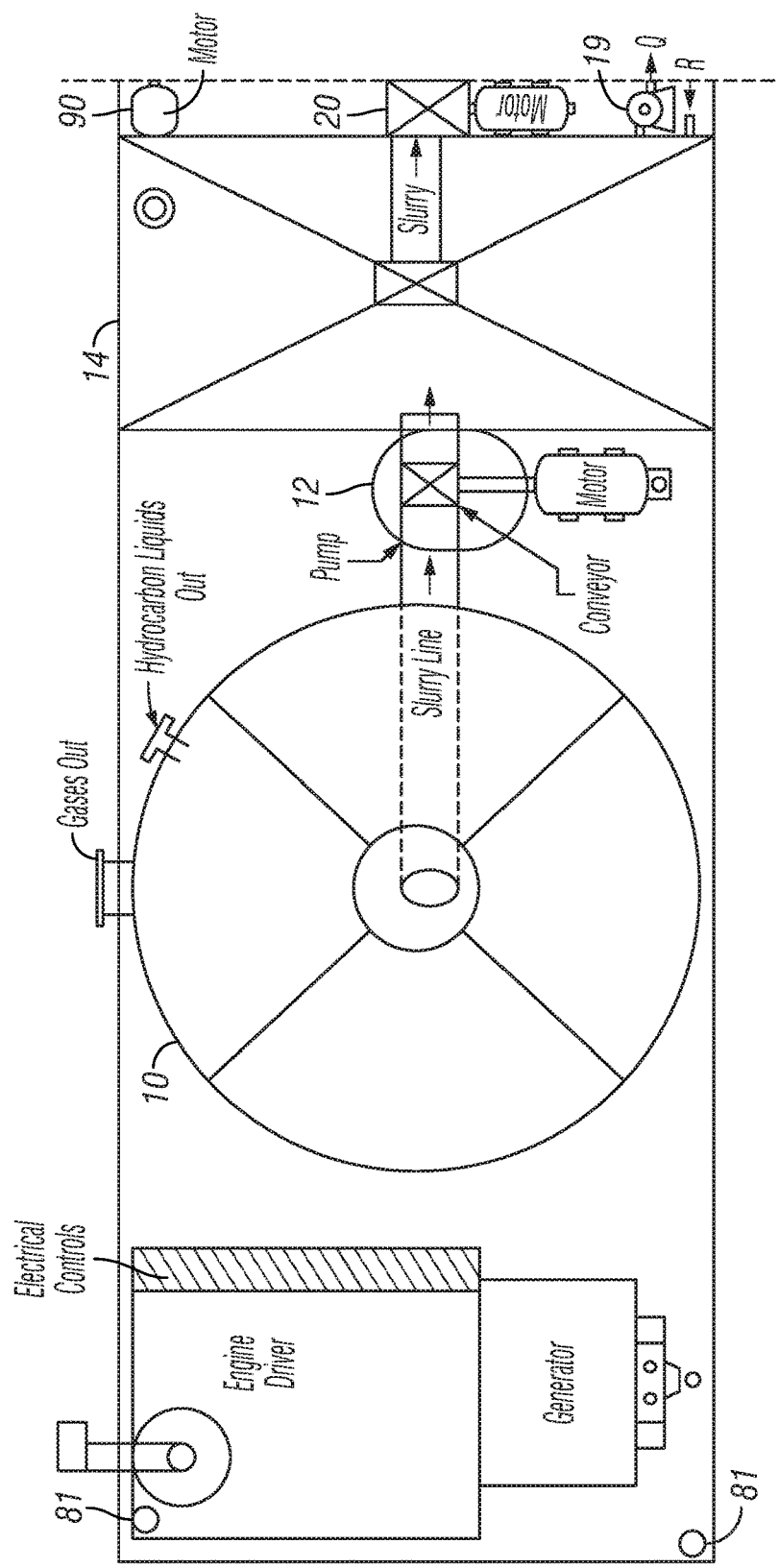
FIGS. 3A and 3B, when connected by the overlapping components next to their dotted lines, are a plan view of the example of FIGS. 2A and 2B.
Figure 3B:
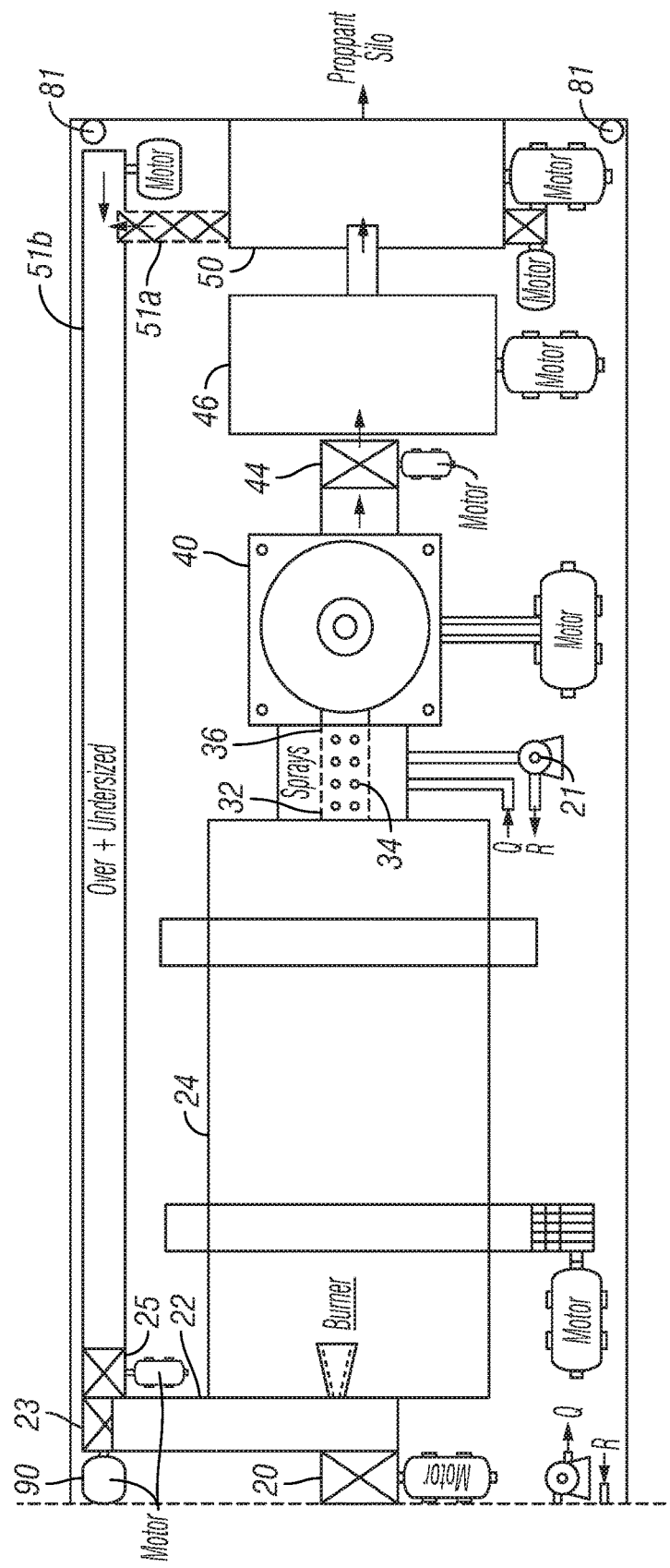

The milled proppant material flows by gravity down through the grinding zone of the mill and is discharged onto vibrating screen 50 where the mesh openings are selectively sized to a specific sieve value. For example, for soft mineral shale the mesh openings are in the 590 micron range or a #30 sieve. For hard mineral shale (for example) the mesh openings would be in the 150 micron range or a #100 sieve. Proppant material of the proper size flows downward by gravity through a selectively sized screen exiting at "A." Proppant material that is too large to pass through the slanted, vibrating screen 53 exits onto belt 51a (seen better in FIG. 3B), and the rest drops to screen 55. Proppant material between the sizes of screens 53 and 55 exit as correctly sized proppant at "A" and is transported to silo 26 (FIG. 1). Under-sized proppant drops onto belt 51a which conveys the under-sized and over-sized proppant to belt 51b, which then carries the proppant back to kiln 24, through elevator 25. FIGS. 3A and 3B illustrate a top view of an example of the invention in which the components are mounted on a trailer or skid mounted that are assembled at a well site with biocide and other components (e.g., FIGS. 4 and 5). Such trailers or skids are leveled in some examples by leveling jacks 81.

As seen in FIGS. 3C and 3D, elevator 25 deposits material into the top of feed hopper 22 and elevator 23 deposits material from the silo into feed hopper 22 from a lower level through an opening in feed hopper 22.

The properly-sized proppant materials flow is fed, by gravity, into a specification proppant container (not shown) for transfer to the specification proppant storage silo 26 (FIG. 1) which may also contain specification proppant from another source.

Referring now to FIG. 2B, it is desirable to control the viscosity of the proppant feed mixture, to attain stability of sustaining an optimum fusion temperature (in some examples, approximately 2200 degrees Fahrenheit). As the proppant feed mixture temperature is rising, due to the heat in kiln 24, the process of fusing the various inorganic materials into a uniformly viscous mass is achieved when the temperature in the proppant mixture reaches the fusion temperature of silicon dioxide or sand. The viscosity of the proppant material is a function of the temperature of the material itself. Such control is accomplished in various ways.

In at least one example, the temperature of the fused material is measured, by any means know to those of skill in the art, for example, an optical pyrometric sensor in quench system 32, as it exits from the kiln. If the temperature is above the fusion point of the material, it will be too liquid, and the fuel to the kiln is reduced. At the same time, more specification proppant may be added to the feed hopper 22. This affects the temperature because the material coming from the slurry is not uniform and is not dry; adding proppant from the silo evens out the variability.

Referring now to FIG. 2C, a schematic is seen in which sensor 67 signals integrator 69 with the temperature of the output of the kiln 24. Integrator 69 then controls variable-speed motor 90 (FIG. 3A) that operates elevator 23 (see also FIG. 3B) that carries proppant from the bottom of proppant silo 26 and discharges it into the slagging rotary kiln feed-hopper 22. The different material streams are comingled in the feed-hopper 22 before they enter the revolving drum of the kiln 24. The proportion or amount of specification proppant that is needed to be added to the material stream from the water/solids tank 14 is adjusted, depending upon the changes in the composition of the materials coming from the water/solids separation tank 14. This increases uniformity of the proppant material feed mixture that kiln 24 uses in the fusion process. In at least one example, if the temperature is too high, the fuel to the burner is reduced, if that does not correct it, the amount of proppant to the kiln will be increased. Likewise, if the temperature is too low, the fuel is increased to the burner; and, if that does not work, the amount of proppant is decreased. Alternative arrangements will occur to those of skill in the art.

Referring back to FIG. 2C, integrator 69 also controls valve 63 to increase or decrease the supply of fuel 61 for kiln burner 65.

Referring again to FIG. 1, one example of the invention is seen in which separator 10 is seen feeding the slurry to separator 14, and water from separator 10 is the joined with new "make-up" (in tank 17) water to be used in injection in a new fracturing job. The combined flows are treated by an electromagnetic biocide/coalescer 13 of the type described in U.S. Pat. No. 6,063,267, incorporated herein by reference for all purposes (commercially available as a Dolphin model 2000), which is set, in at least one example, to impart an electro-magnetic pulse having the following characteristics: selectable, variable, and tuneable frequencies in a range between about 10-80 KHz. Such a pulse is sufficient to kill biological organisms and to cause a positive charge to be applied to the water, making the dissolved solids capable of being precipitated or coalesced in the well.

Figure 4:
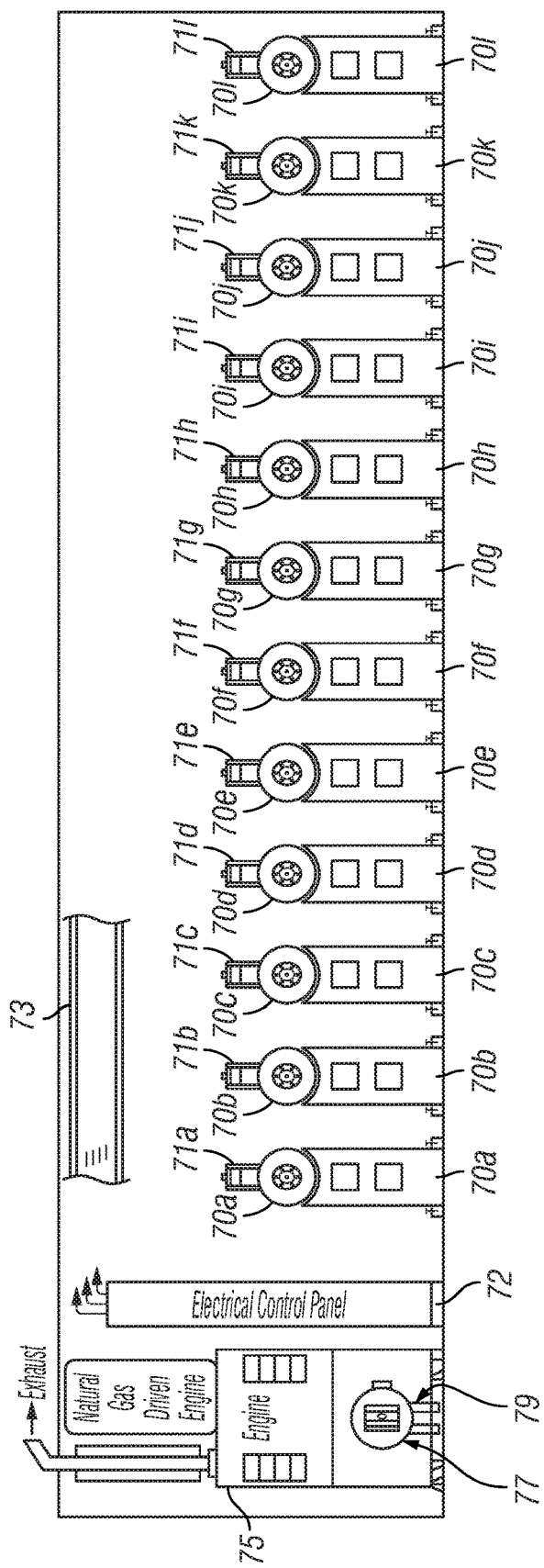
FIG. 4 is a side view of a further example of the invention.
Figure 5:
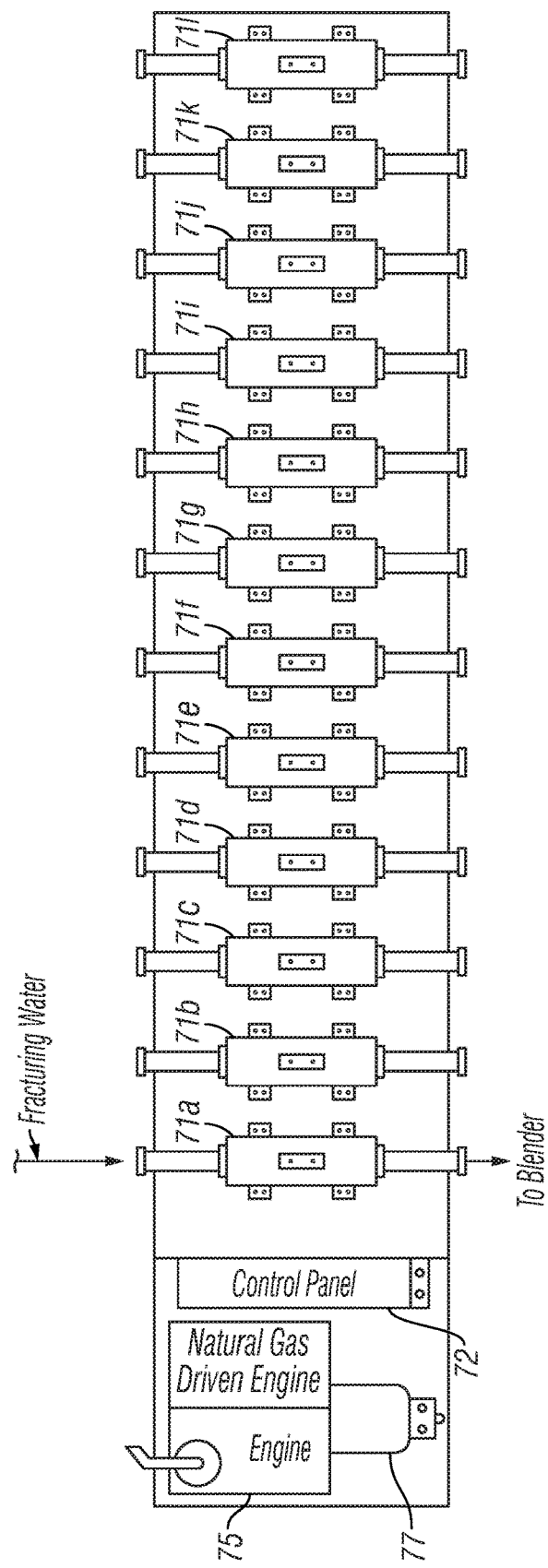
FIG. 5 is a plan view of the example of FIG. 4.

FIGS. 4 and 5 are side and top views, respectively, of an example trailer-mounted or skid-mounted system that includes a set of biocide/coalescers 70a-70l, organized to receive fracturing tank water in the type of flow rate used in common shale-fracture operations. Such units are run from an elecuical control panel 72, that is connected to an overhead power and control distribution rack 73 that connects to overhead power feed components 71a-71l. Power is supplied by an engine 75 that turns an electrical generator 77 that is connected to power feed 79 for supplying power in a manner known to those of skill in the art.

Referring now to FIG. 2A1, an alternative to the embodiment of FIG. 2A as seen in which the water level of two-phase separator 14 is at the same as the level and three-phase separator 10. In such an embodiment, there is fluid communication through a diaphragm pump 12 and tanks are at atmospheric pressure such that the liquid gas interface is at the same level.

Figure 6:
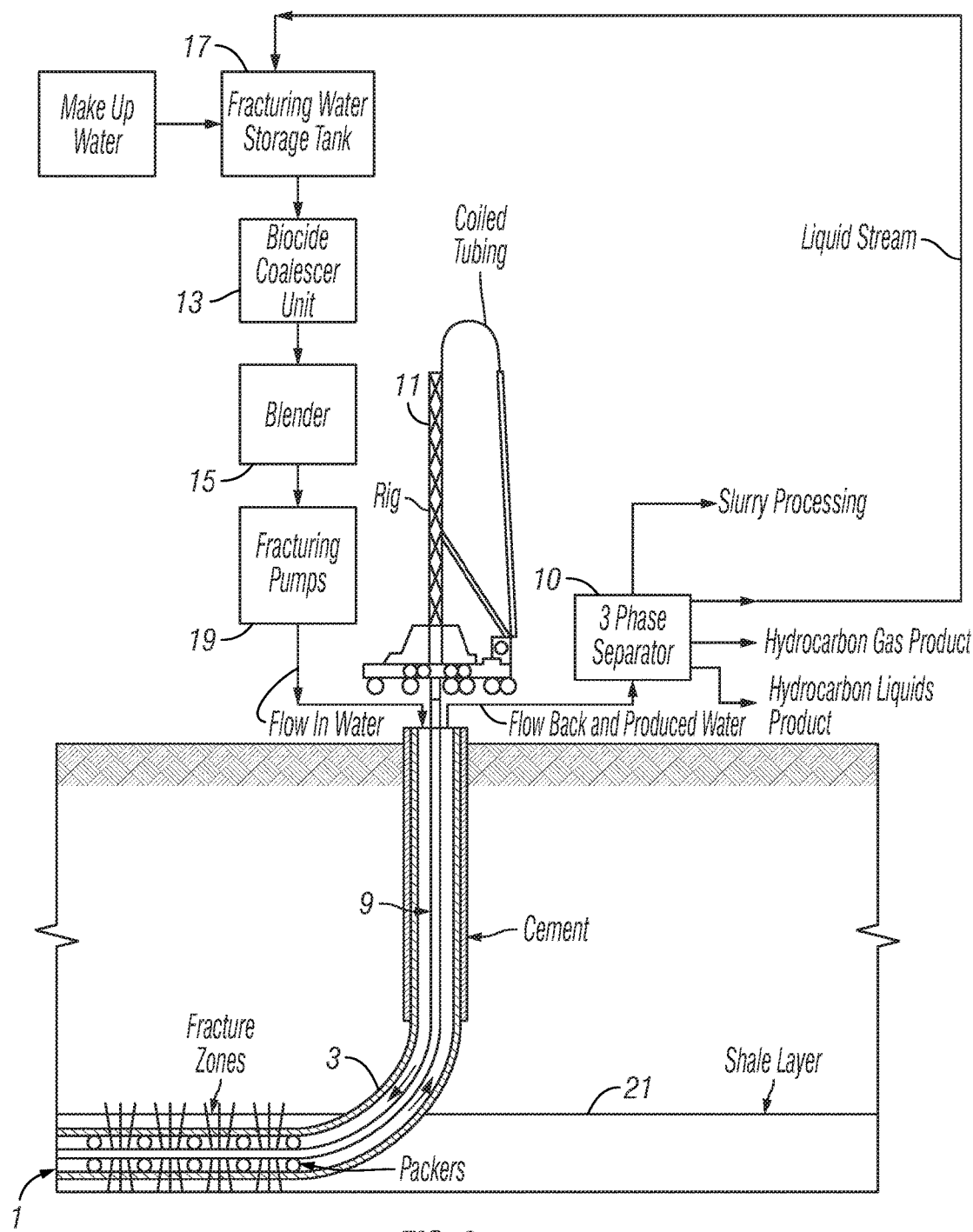
FIG. 6 is a diagram of a well site showing the flow of various materials used in various examples of the invention.

Referring now to FIG. 6, according to another example of the invention, a system is provided for treating hydrocarbon well fracture water from a hydrocarbon well, system comprising a means for separating solids from fracture water comprising a three-phase, four material separator 10, wherein a flow of water with suspended solids results that is passed to a fracturing water storage tank 17. From there so-called "make-up water" may be added to fracture water storage tank 17 and the flow of water is passed through a means for separating the flow of water into a plurality of flows of water (described in more detail below); to a means for generating positive charge in the plurality of flows of water (for example, a set of biocide coalescers or units as described above), wherein a plurality of flows of positively-charged water results. A means for comingling plurality of flows of positively-charged water more evenly distributes the positive charge in the water before it is passed to blender 15 for use in subsequent well fracturing operations.

Figure 7:
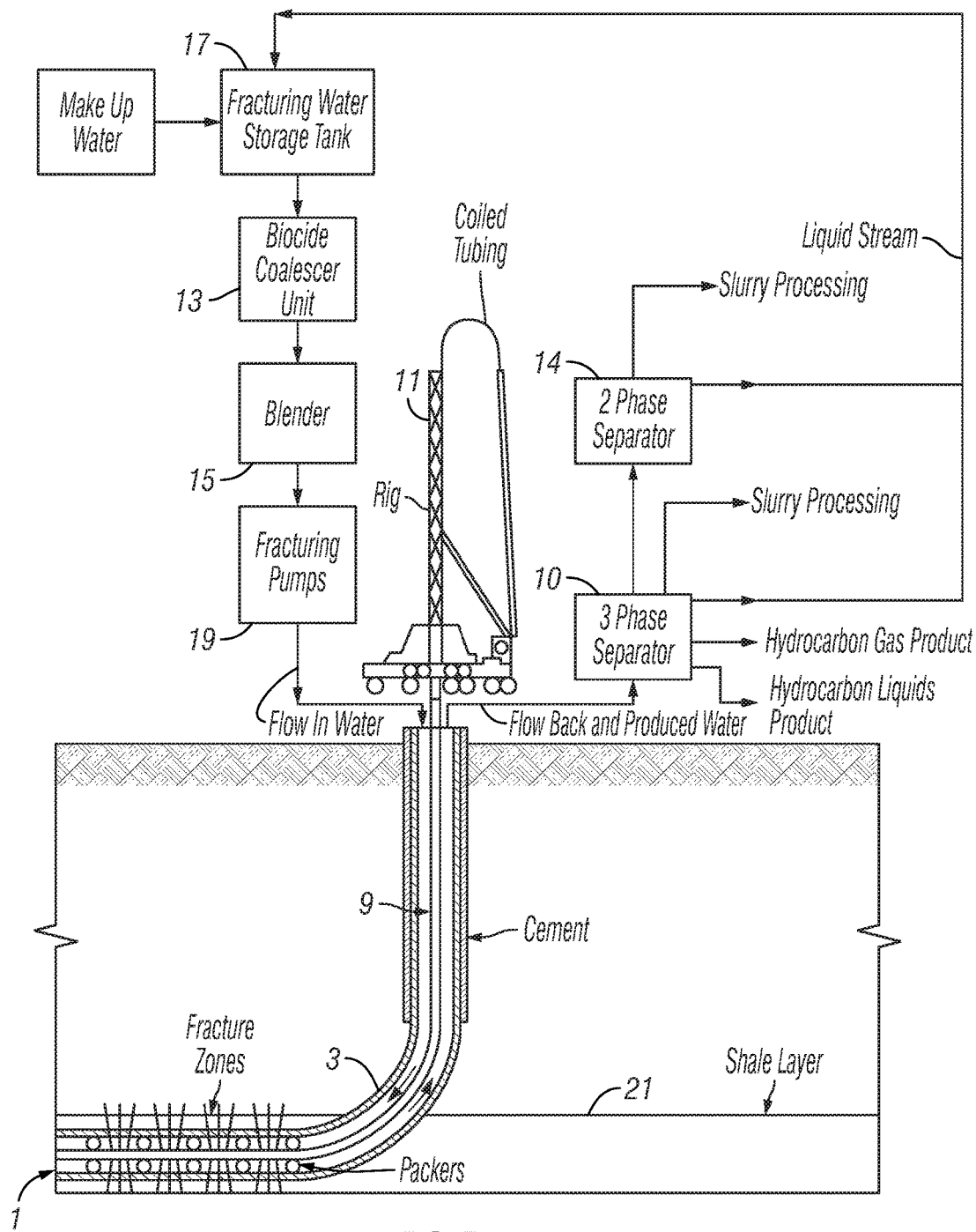
FIG. 7 is a diagram of a well site showing the flow of various materials used in various examples of the invention.

FIG. 7 illustrates an example in which the means for separating further comprises a second stage, two-phase separator 14, the two-phase separator comprising an input for receiving water flow from the three-phase gas oil separator. The water flow from the three-phase separator is taken from the midsection of the separator, while most solids dropped out at the bottom, as described above. However, the water from the three-phase separator includes suspended solids that can damage a biocide coalesce or unit. Accordingly, in one example embodiment, the water flow from the three-phase separator 10 is passed to the input of a two-phase separator 14, which also includes an output for the flow of water with suspended smaller suspended solids. Two-phase separator 14 also drops solids out of its lower section in the form of a slurry. The slurry from three-phase separator 10 and two-phase separator 14 are further processed (for example as described above) or disposed of in some other manner.

Figure 8:
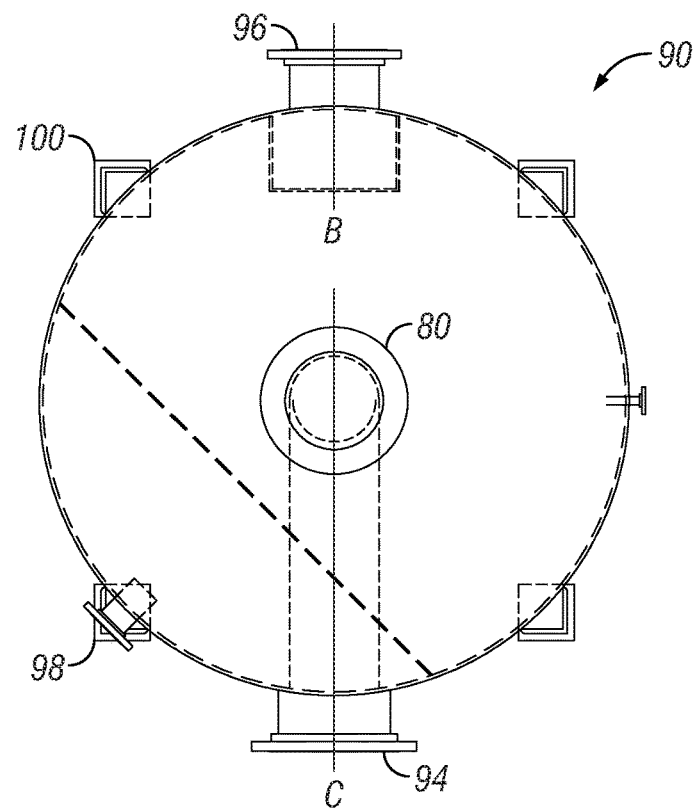
FIG. 8 is a top view of an example of the invention.
Figure 9:
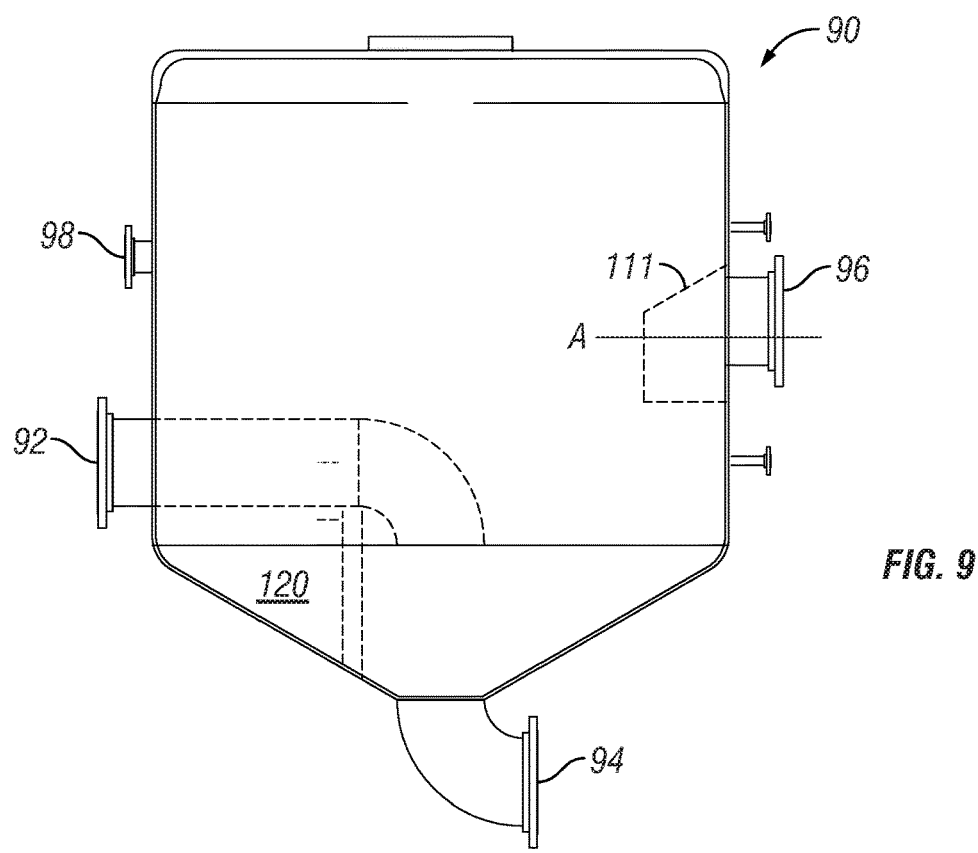
FIG. 9 is a side view of an example of the invention.
Figure 10A:
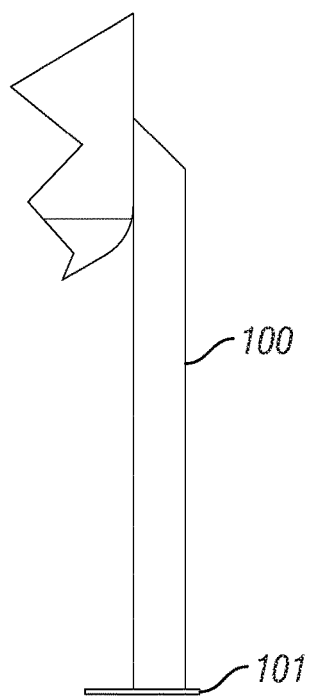
FIG. 10A is a side view of support leg 100 of FIG. 8.
Figure 10B:
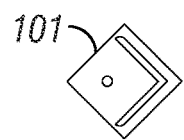
FIG. 10B depicts a top view of foot 101 of FIG. 10A.

Referring now to FIGS. 8 and 9, an example of a three-phase, four-material separator 90, useful according to some embodiments of the invention and place of three-phase separator 10, as seen. Separator 90 and includes an input 92, a slurry output 94, a liquid hydrocarbon output 98 and a gas output 80. As also seen in FIG. 10A, separator 90 is supported by legs 100 (which includes a foot 101, as seen in FIG. 10B) welded to the side of separator 90.

Figure 11:
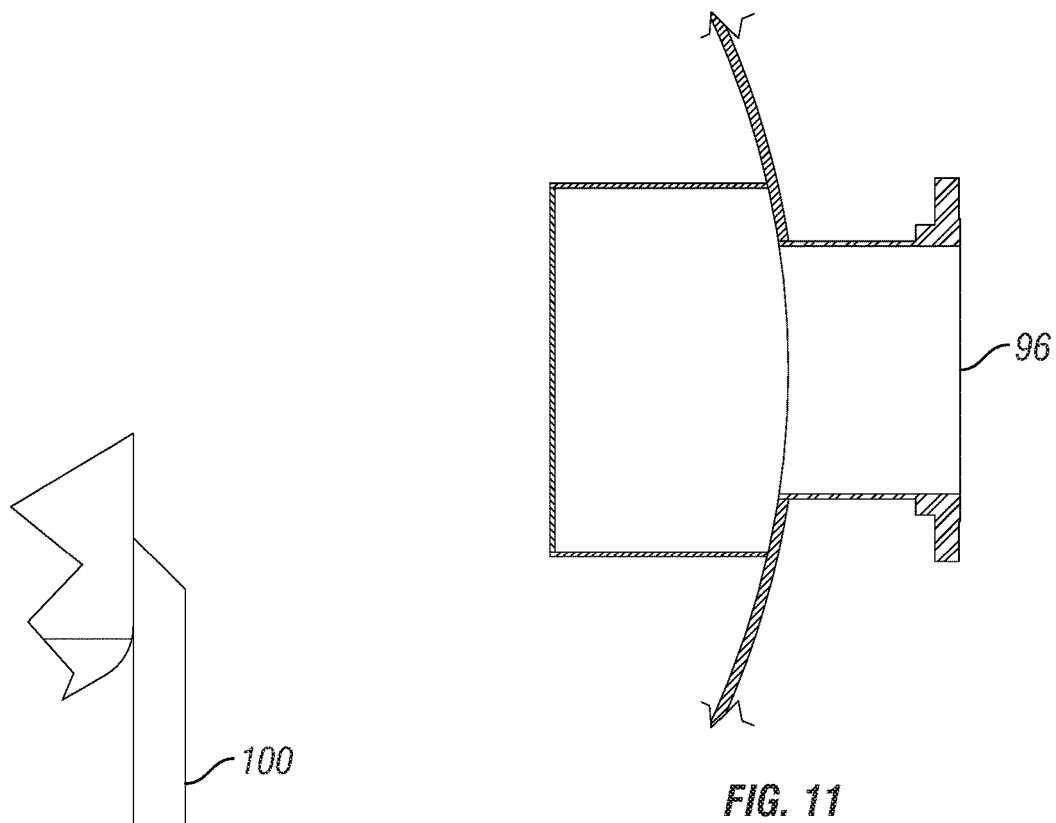
FIG. 11 is a cross section view taken through line A of FIG. 9.
Figure 12:
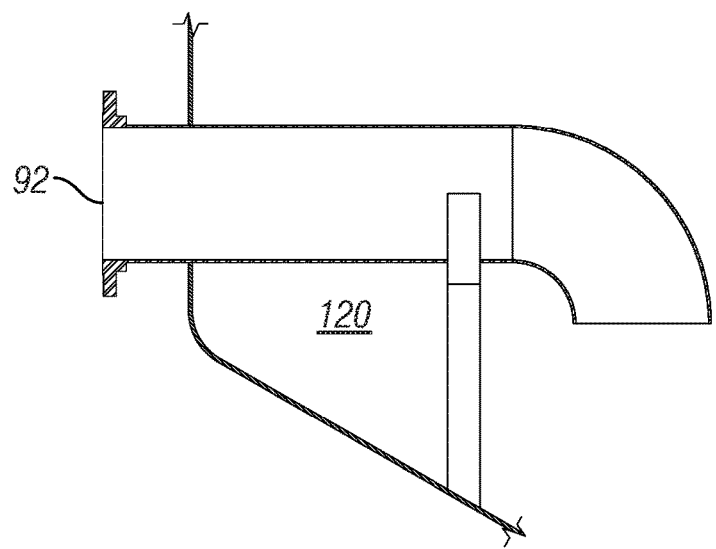
FIG. 12 is a cross section view taken along line C of FIG. 8.
Figure 13:
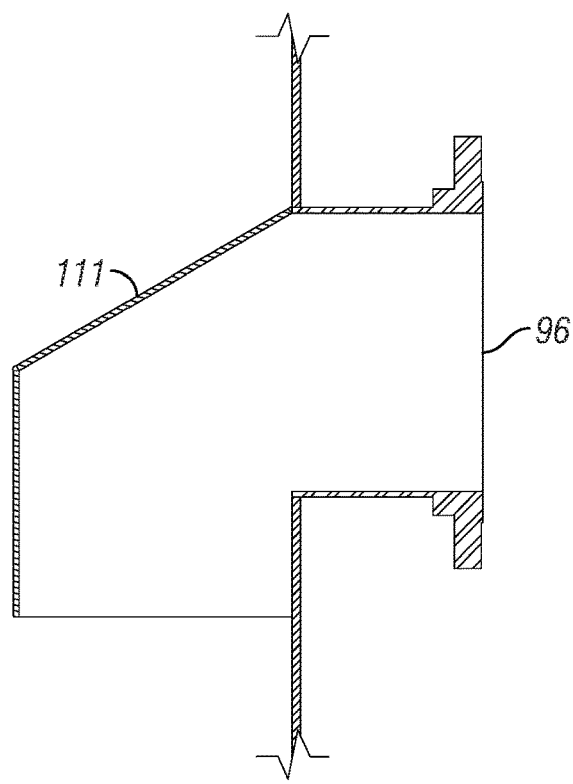
FIG. 13 is a cross section view taken along line B of FIG. 8.

Referring again to FIG. 9, as well as FIG. 11 (which is a cross section taken through line A of FIG. 9) and FIG. 13 (which is a cross-sectional taken along line B of FIG. 8), a baffle 111 allows water having some suspended solids to exit separator 90 while larger solids exit as the slurry at the bottom exit 94. FIG. 12 illustrates a cross-section of input 92 (taken along line C of FIG. 8) where input pipe 92 is supported by support 120 connected to the bottom of separator 90 and holding input pipe 92 and a saddle.

In a further example, there is also provided: means for monitoring an oil/water interface level; and means for controlling the oil/water interface level in the first and second separator. In one such example, the means for monitoring comprises an oil/water interface level indicator and control valve sensor (for example, a cascade control system).

Figure 18:
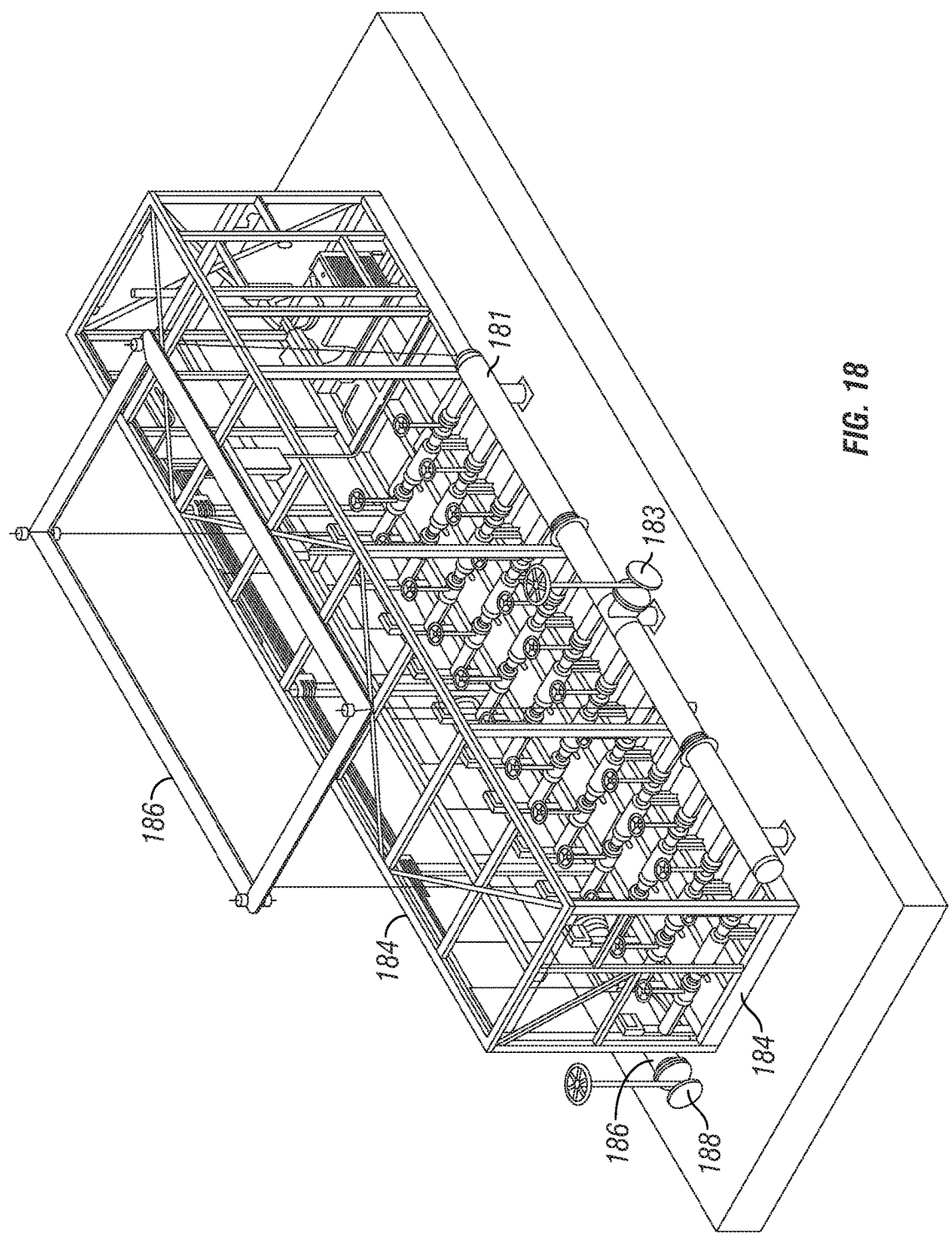
FIG. 18 is a perspective view of examples of the invention.

As illustrated in FIG. 18, in some examples, the means for separating the flow of water into a plurality of flows of water comprises a manifold 181 having an input port valve 183 to receive the flow of water with suspended solids from a means for separating and a plurality of output ports attached to biocide coalescer units 184, each output port having a cross-sectional area that is smaller than the cross-sectional area of the input of the manifold. In some examples, the sum of the cross-sectional areas of the output ports is greater than the cross-sectional area of the input ports, whereby the flow rate exiting the manifold is less than the flow rate entering the manifold. In at least one example, the manifold 181 comprises a 1:12 manifold (for example, having cross-sectional diameters of 4 inches in the output ports and a larger cross sectional diameter in the input ports). In an alternative example, the means for separating the flow of water into a plurality of flows of water comprises a water truck as is known in the art (not shown) having a plurality of compartments, each compartment being positioned to receive a portion of the flow of water. In operation, water passes through valve 183 into manifold 181 and the flow is slowed as it is separated into parallel flows through the parallel-connected biocide coalescer units 184 to increase residence time for imparting electromagnetic flux in order to maximize the positive charges the electromagnetic flux imparts to the water. The output of the units 184 is comingled in manifold 186, who's output is controlled by valve 188. The entire assembly of the manifolds and biocide coalescer units is, in some examples, mounted on frame 184 which may be lifted by harness 186 onto a pad at a well site or onto the bed of a truck for transportation.

In a further example, the means for generating positive charge comprises means for treating each of the plurality of flows of water with electromagnetic flux. At least one such example is seen in FIGS. 19-28, where the means for treating each of the plurality of flows of water with electromagnetic flux comprises: a pipe and at least one electrical coil having an axis substantially coaxial with the pipe. In some such examples, the pipe consists essentially of non-conducting material. In some such examples, the pipe consists essentially of stainless steel. In a variety of examples, there is also provided a ringing current switching circuit connected to the coil. In some such examples, the ringing current switching circuit operates in a full-wave mode at a frequency between about 10 kHz to about 80 kHz.

Figure 19:
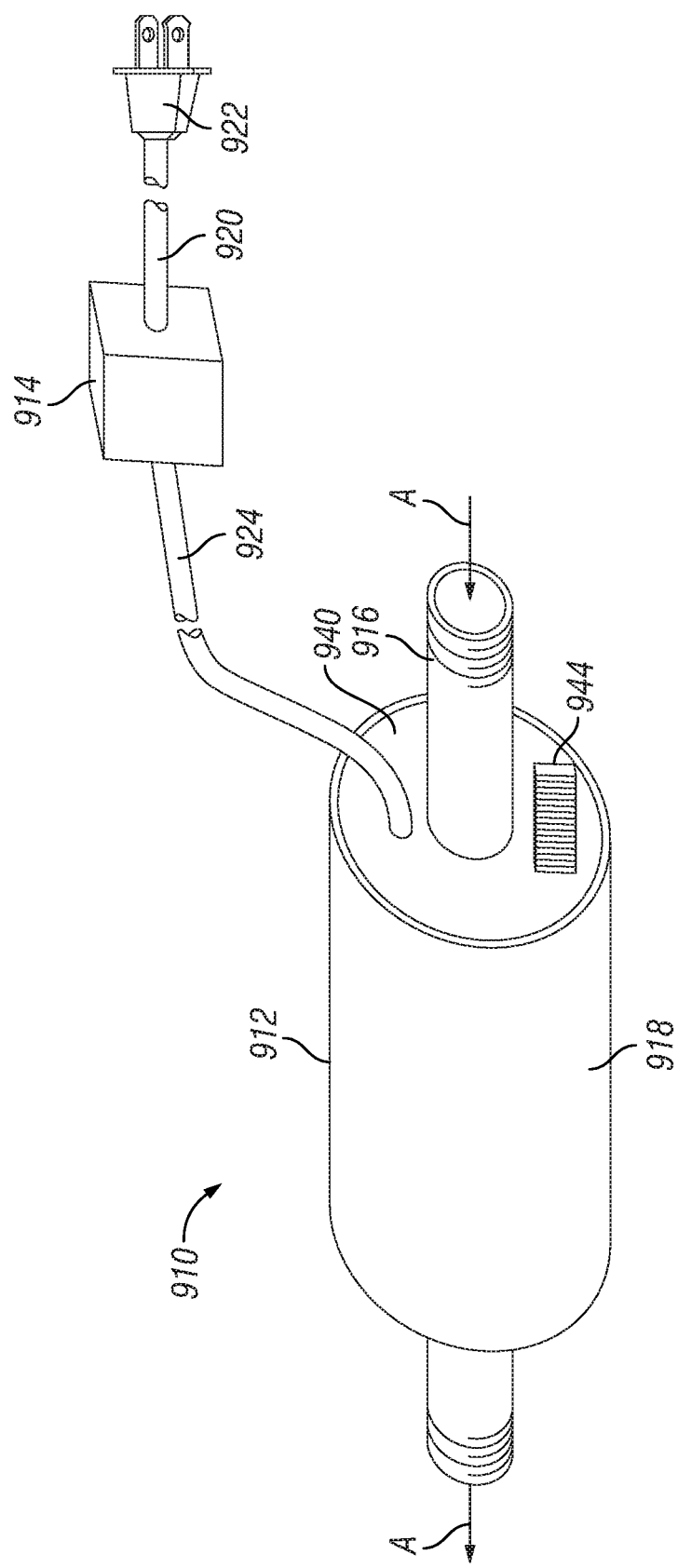
FIG. 19 is a perspective view of an apparatus embodying the invention.

Specifically, still referring to FIGS. 19-28, turning first to FIG. 19, an apparatus embodying the invention is indicated generally at 910 and comprises basically a pipe unit 912 and an alternating current electrical power supply 914. The pipe unit 912 includes a pipe 916 through which liquid to be treated passes with the direction of flow of liquid being indicated by the arrows A. The pipe 916 may be made of various materials, but as the treatment of the liquid effected by the pipe unit 912 involves the passage of electromagnetic flux through the walls of the pipe and into the liquid passing through the pipe, the pipe is preferably made of a non-electrical conducting material to avoid diminution of the amount of flux reaching the liquid due to some of the flux being consumed in setting up eddy currents in the pipe material. Other parts of the pipe unit 912 are contained in or mounted on a generally cylindrical housing 918 surrounding the pipe 916.

The pipe unit 912 is preferably, and as hereinafter described, one designed for operation by a relatively low voltage power source, for example, a power source having a voltage of 911 V(rms) to 37 V(rms) and a frequency of 60 Hz and, therefore, the illustrated power supply 914 is a voltage step down transformer having a primary side connected to an input cord 920 adapted by a plug 922 for connection to a standard mains, such as one supplying electric power at 120 V 60 Hz or 240 V 60 Hz, and having an output cord 924 connected to the secondary side of the transformer and supplying the lower voltage power to the pipe unit 912. The pipe unit 912 may be designed for use with pipes 916 of different diameter and the particular output voltage provided by the power source 914 is one selected to best suit the diameter of the pipe and the size and design of the related components of the pipe unit.

Figure 20:
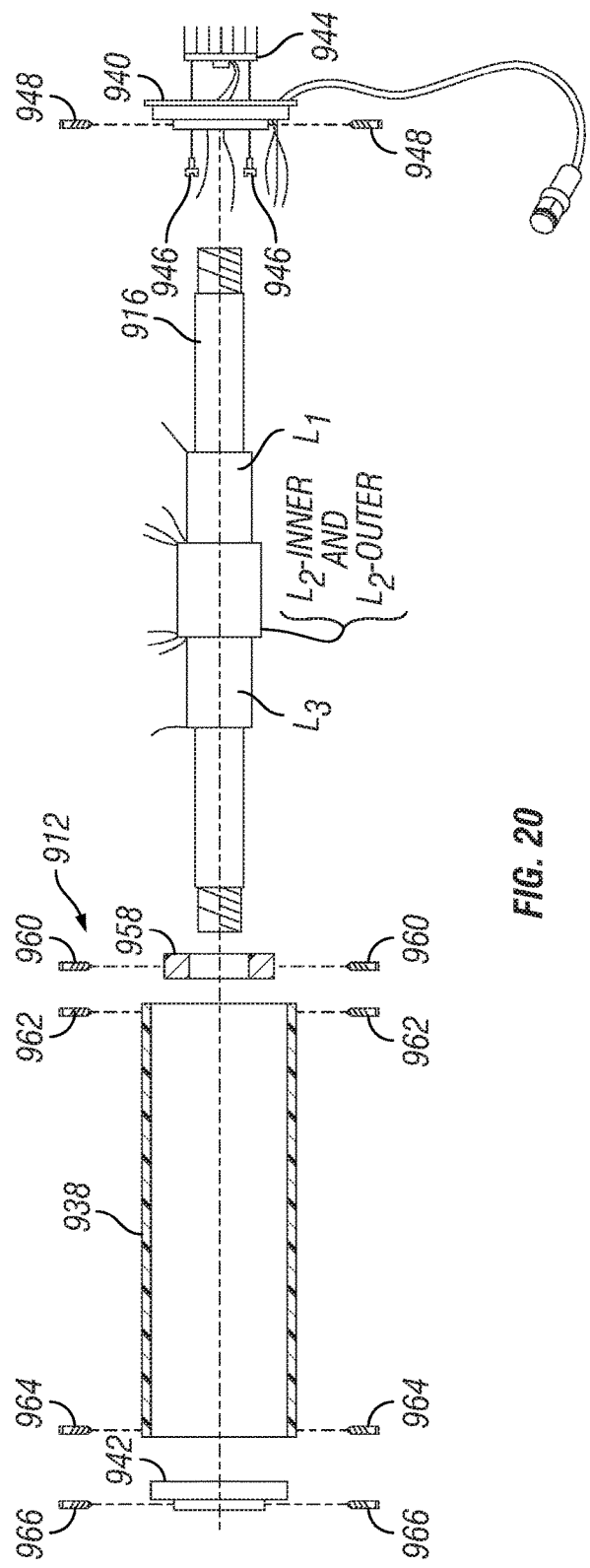
FIG. 20 is an exploded view of the pipe unit of the apparatus of FIG. 19.
Figure 21:
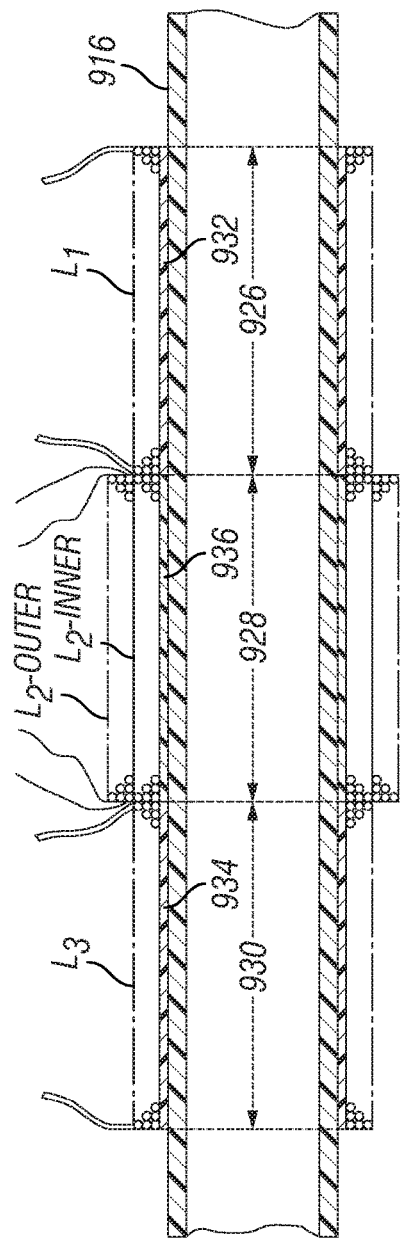
FIG. 21 is a longitudinal cross sectional view taken through the pipe unit of FIG. 19.

The pipe unit 912, in addition to the housing 918 and pipe 916, consists essentially of an electrical coil means surrounding the pipe and a switching circuit for controlling the flow of current through the coil means in such a way as to produce successive periods of ringing current through the coil means and resultant successive ringing periods of electromagnetic flux passing through the liquid in the pipe 916. The number, design and arrangement of the coils making up the coil means may vary, and by way of example in FIGS. 20 and 21 the coil means is shown to consist of four coils, $L_1$, $L_2$-outer, $L_2$-inner and $L_3$ arranged in a fashion similar to that of U.S. Pat. No. 5,702,600, incorporated herein by reference for all purposes. The coils, as shown in FIGS. 20 and 21, are associated with three different longitudinal sections 926, 928 and 930 of the pipe 916. That is, the coil $L_1$ is wound onto and along a bobbin 932 in turn extending along the pipe section 926, the coil $L_3$ is wound on and along a bobbin 934 itself extending along the pipe section 930, and the two coils $L_2$-inner and $L_2$-outer are wound on a bobbin 936 itself extending along the pipe section 928, with the coil $L_2$-outer being wound on top of the coil $L_2$-inner. The winding of the two coils $L_2$-inner and $L_2$-outer on top of one another, or otherwise in close association with one another, produces a winding capacitance between those two coils which forms all or part of the capacitance of a series resonant circuit as hereinafter described.

Referring to FIG. 20, the housing 918 of the pipe unit 912 is made up of a cylindrical shell 938 and two annular end pieces 940 and 942. The components making up the switching circuit are carried by the end piece 940 with at least some of them being mounted on a heat sink 944 fastened to the end piece 940 by screws 946. In the assembly of the pipe unit 912, the end piece 940 is first slid onto the pipe 916, from the right end of the pipe as seen in FIG. 20, to a position spaced some distance from the right end of the pipe, and is then fastened to the pipe by set screws 948. The three coil bobbins 932, 936 and 934, with their coils, are then moved in succession onto the pipe 916 from the left end of the pipe until they abut one another and the end piece 940, with adhesive applied between the bobbins and the pipe to adhesively bond the bobbins to the pipe. An annular collar 950 is then slid onto the pipe from the left end of the pipe into abutting relationship with the coil $L_3$ and is fastened to the pipe by set screws 960, 960. The shell 938 is then slid over the pipe and fastened at its right end to the end piece 940 by screws 962, 962. Finally, the end piece 942 is slid over the pipe 916, from the left end of the pipe, and then fastened to the shell 938 by screws 964 and to the pipe by set screws 966.

Figure 22:
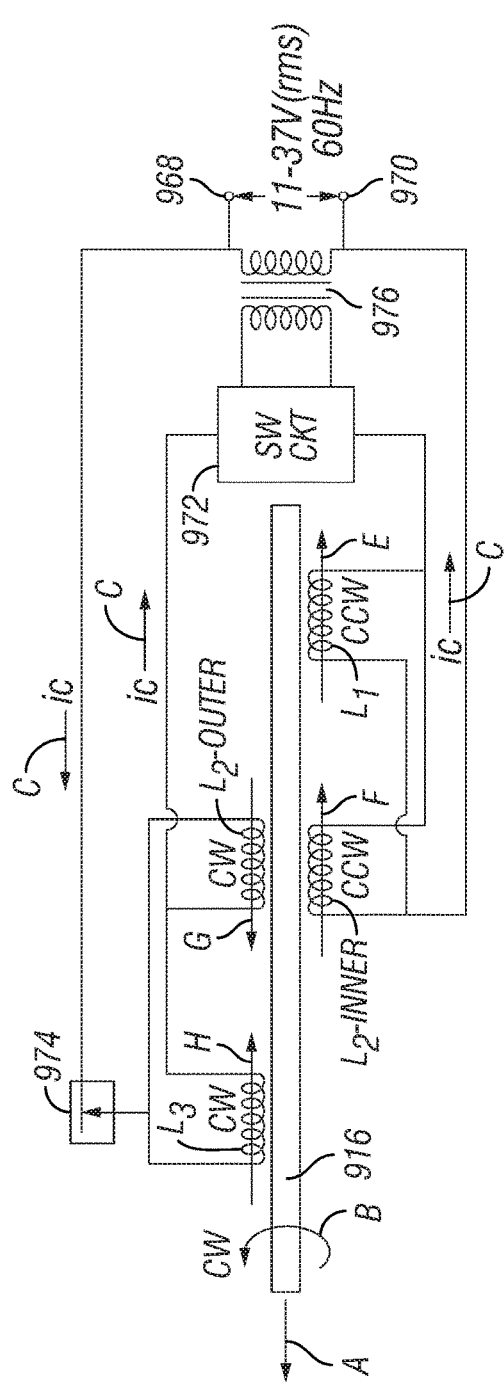
FIG. 22 is a simplified circuit diagram of the pipe unit of FIG. 19.

The basic wiring diagram for the pipe unit 912 is shown in FIG. 22. The input terminals connected to the power source 914 are indicated at 968 and 970. A connecting means including the illustrated conductors connects these input terminals 968 and 970 to the coils and to the switching circuit 972 in the manner shown with the connecting means including a thermal overload switch 974. The arrow B indicates the clockwise direction of coil winding, and in keeping with this reference the coil $L_3$ and the coil $L_2$-outer are wound around the pipe 916 in the clockwise direction and the coils $L_1$ and $L_2$-inner are wound around the pipe in the counterclockwise direction. Taking these winding directions and the illustrated electrical connections into account, it will be understood that when a current $i_c$ flows through the coils in the direction indicated by the arrows C, the directions of the magnetic fluxes passing through the centers of each of the coils, and therefore through the liquid in the pipe, are as shown by the arrows E, F, G and in FIG. 22. That is, the fluxes passing through the centers of the coils $L_1$, $L_2$-inner and $L_3$ move in one direction longitudinally of the pipe and the flux passing through the center of the coil $L_2$-outer moves in the opposite direction. Depending on the design of the switching circuit 972, it may be necessary or desirable to provide a local ground for the switch circuit 972 and when this is the case, the switching circuit may be connected with the input terminals 968 and 970 through an isolation transformer 976, as shown in FIG. 22.

Figure 23:
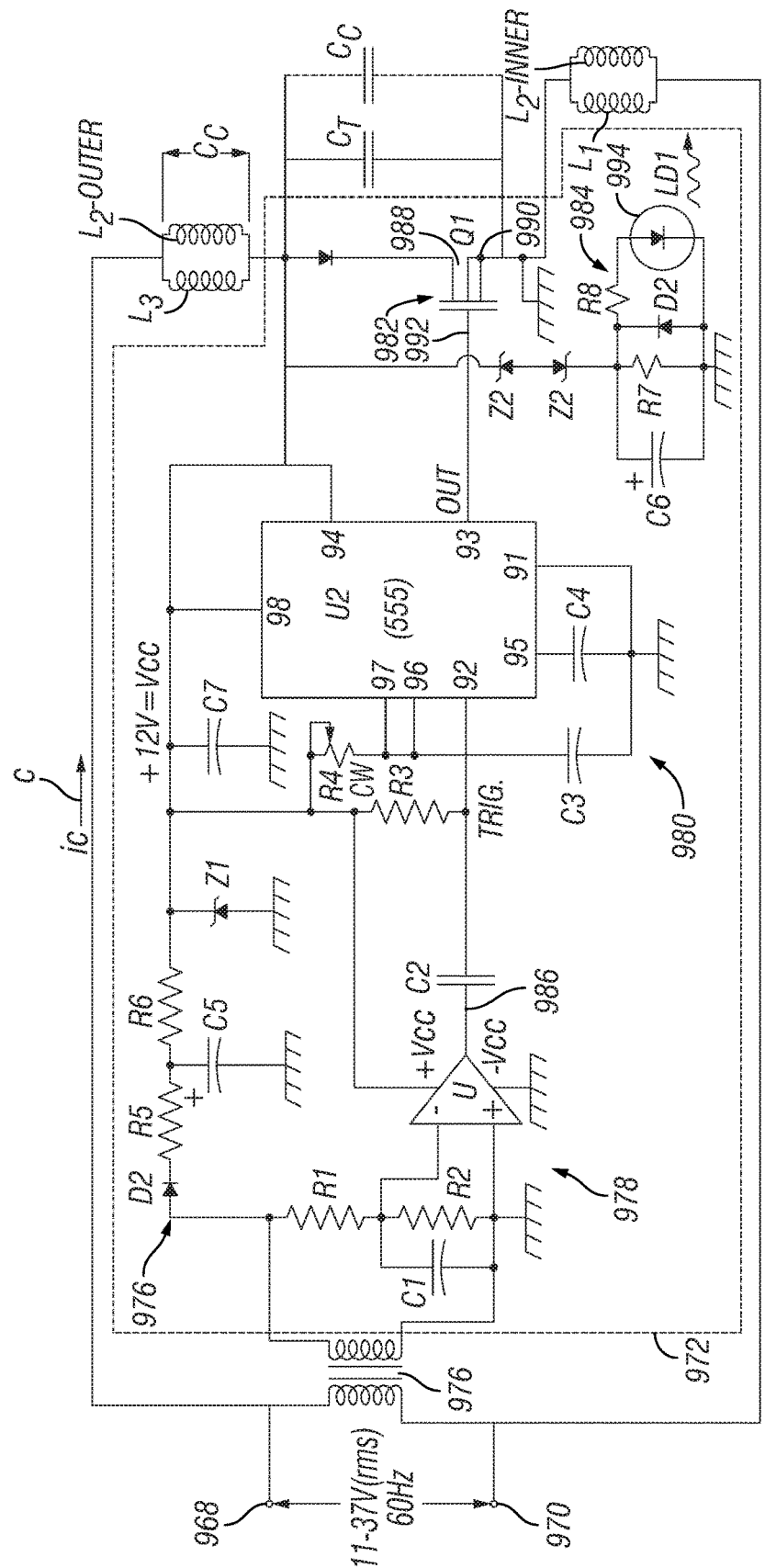
FIG. 23 is a detailed schematic diagram of the electrical circuit of the pipe unit of FIG. 19.

FIG. 23 is a wiring diagram showing in greater detail the connecting means and switching circuit 972 of FIG. 22. Referring to FIG. 23, the switching circuit 972 includes a 12 V power supply subcircuit 976, a comparator subcircuit 978, a timer subcircuit 980, a switch 982 and an indicator subcircuit 984.

The components D2, R5, C5, R6 and Z1 comprise the 12 V DC power supply subcircuit 976 which powers the other components of the trigger circuit. Resistors R1 and R2 and the operational amplifier U1 form the comparator subcircuit 978. The resistors R1 and R2 form a voltage divider that sends a signal proportional to the applied AC voltage to the operational amplifier U1. The capacitor C1 serves to filter out any "noise" voltage that might be present in the AC input voltage to prevent the amplifier U1 from dithering. The amplifier U1 is connected to produce a "low" (zero) output voltage on the line 986 whenever the applied AC voltage is positive and to produce a "high" (+12 V) output when the AC voltage is negative.

When the AC supply voltage crosses zero and starts to become positive, the amplifier U1 switches to a low output. This triggers the 555 timer chip U2 to produce a high output on its pin 93. The capacitor C2 and R3 act as a high-pass filter to make the trigger pulse momentary rather than steady. The voltage at pin 92 of U2 is held low for about one-half millisecond. This momentary low trigger voltage causes U2 to hold a sustained high (+12 V) on pin 93.

The switch 982 may take various different forms and may be a sub-circuit consisting of a number of individual components, and in all events it is a three-terminal or triode switch having first, second and third terminals 988, 990 and 992, respectively, with the third terminal 992 being a gate terminal and with the switch being such that by the application of electrical signals to the gate terminal 992 the switch can be switched between an ON condition at which the first and second terminals are closed relative to one another and an OFF condition at which the first and second terminals are open relative to one another. In the preferred and illustrated case of FIG. 23, the switch 982 is a single MOSFET (Q1). The MOSFET (Q1) conducts, that is sets the terminals 988 and 990 to a closed condition relative to one another, as soon as the voltage applied to the gate terminal 992 becomes positive as a result of the input AC voltage appearing across the input terminals 968 and 970 becoming positive. This in turn allows current to build up in the coils $L_1$, $L_2$-inner, $L_2$-outer, and $L_3$. When the time constant formed by the product of the resistor R4 and the capacitor C3 has elapsed, the 555 chip U2 reverts to a low output at pin 93 turning the MOSFET (Q1) to its OFF condition. When this turning off of (Q1) occurs, any current still flowing in the coils is diverted to the capacitance which appears across the terminals 988 and 990 of (Q1). As shown in FIG. 23, this capacitance is made up of the wiring capacitance $C_c$ arising principally from the close association of the two coils $L_2$-inner and $L_2$-outer. This winding capacitance may of itself be sufficient for the purpose of creating a useful series resonant circuit with the coils, but if additional capacitance is needed, it can be supplied by a separate further tuning capacitor ($C_t$).

When the switch (Q1) turns to the OFF or open condition, any current still flowing in the coils is diverted to the capacitance ($C_c$ and/or $C_t$) and this capacitance in conjunction with the coils and with the power source form a series resonant circuit causing the current through the coils to take on a ringing wave form and to thereby produce a ringing electromagnetic flux through the liquid in the pipe 916. By adjusting the variable resistor R4, the timing of the opening of the switch (Q1) can be adjusted to occur earlier or later in each operative half cycle of the AC input voltage. Preferably, the circuit is adjusted by starting with R4 at its maximum value of resistance and then slowly adjusting it toward lower resistance until the LED indicator 994 of the indicator subcircuit 984 illuminates. This occurs when the peak voltage developed across the capacitance ($C_c$ and/or $C_t$) exceeds 150 V at which voltage the two Zener diodes Z2 can conduct. The Zener diodes charge capacitor 962 and the resulting voltage turns on the LED 994. When this indicator LED lights, the adjustment of the resistor R4 is then turned in the opposite direction until the LED just extinguishes, and this accordingly sets the switch (Q1) to generate a 150 V ringing signal.

Figure 24:
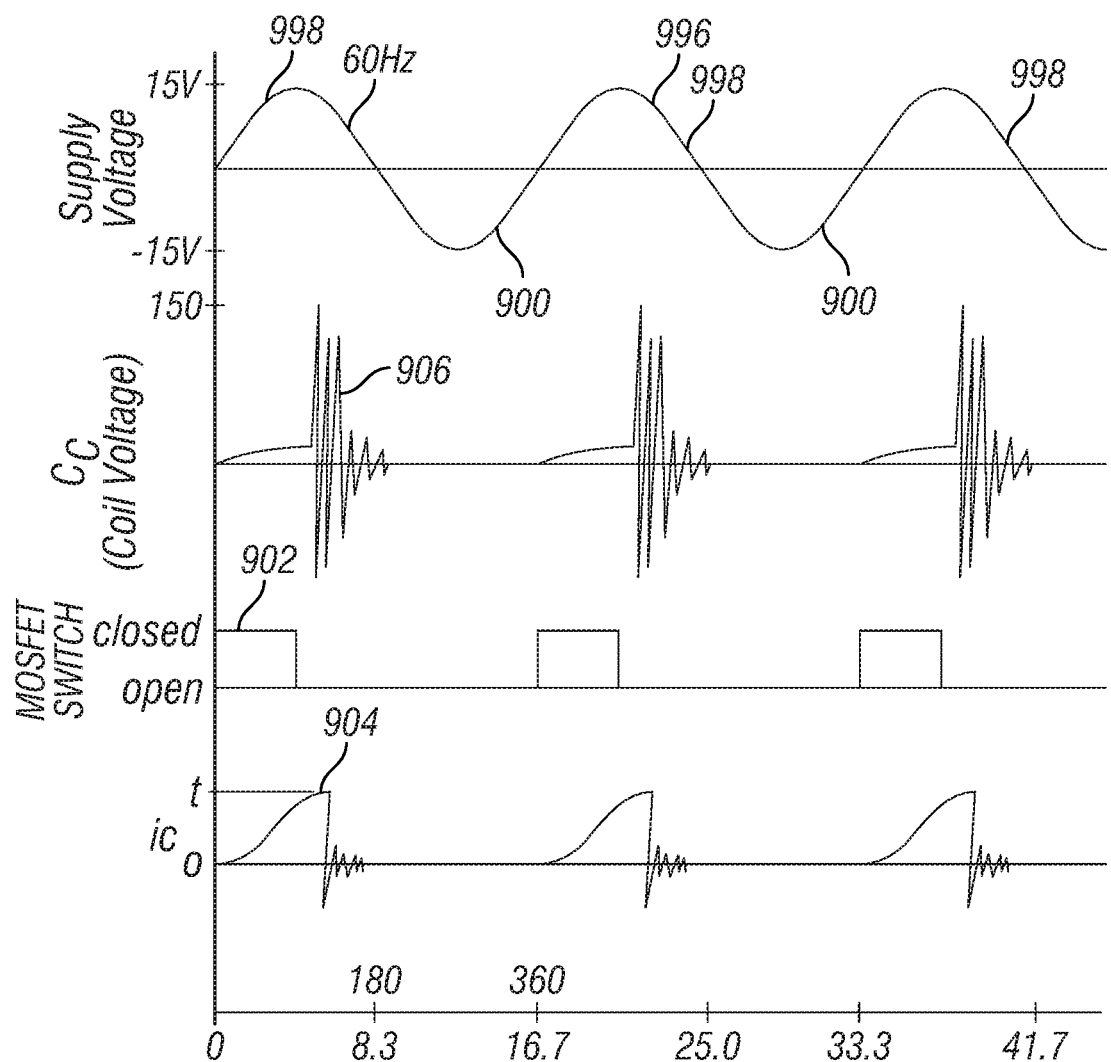
FIG. 24 is a diagram showing certain wave shapes produced by the pipe unit of FIG. 19 during operation.

FIG. 24 illustrates the function of the circuit of FIG. 23 by way of wave forms which occur during the operation of the circuit. Referring to this Figure, the wave form 996 is that of the AC supply voltage applied across the input terminals 968 and 970, the voltage being an alternating one having a first set of half cycles 998 of positive voltage alternating with a second set of half cycles 900 of negative voltage. The circuit of FIG. 23 is one which operates in a half wave mode with periods of ringing current being produced in the coils of the pipe unit only in response to each of the positive half cycles 998. The wave form 902 represents the open and closed durations of the switch (Q1), and from this it will be noted that during each positive half cycle 998 of the supply voltage the switch (Q1) is closed during an initial portion of the half cycle and is opened at a time well in advance of the end of that half cycle (with the exact timing of this occurrence being adjustable by the adjustable resistor R4).

The opening and closing of the switch (Q1) produces the current wave form indicated at 904 in FIG. 24 which for each positive half cycle of the supply voltage is such that the current through the coils increases from zero during the initial portion of the half cycle, during which the switch (Q1) is closed, and then upon the opening of the switch (Q1) the current rings for a given period of time. The voltage appearing across the coils of the pipe unit is such as shown by the wave form 906 of FIG. 24, with the voltage upon the opening of the switch (Q1) taking on a ringing shape having a maximum voltage many times greater than the voltage provided by the power supply 914.

The frequency of the ringing currents produced in the coils and of the ringing voltages produced across the coils can be varied by varying the capacitance ($C_c$ and/or $C_t$) appearing across the switch (Q1) and is preferably set to be a frequency within the range of 10 kHz to 80 kHz.

Parameters of the apparatus of FIGS. 19-24, including nominal pipe size, arrangement of coils in terms of number of turns, gage and length, tuning capacitor capacitance and associated nominal power supply voltage are given in the form of a chart in FIG. 28.

Figure 25:
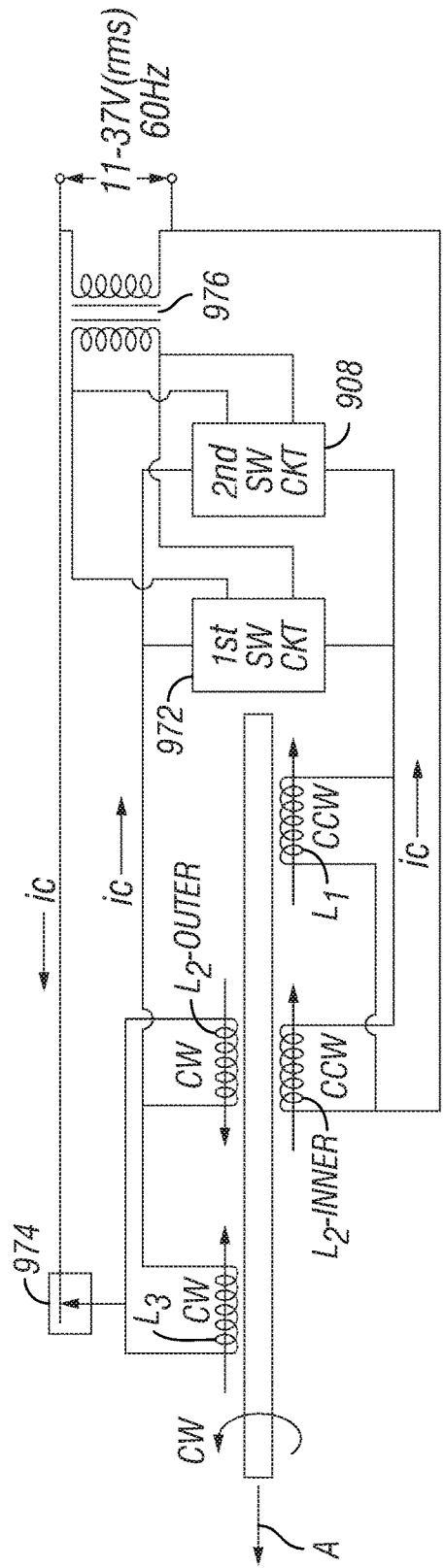
FIG. 25 is a circuit diagram similar to FIG. 4 but showing a modified embodiment of the invention.

As mentioned above, the switching circuit illustrated and described in connection with FIGS. 22, 23 and 24 is one which is operable to produce one period of ringing current and ringing voltage for each alternate half cycle of the applied supply voltage. However, if wanted, the switching circuit can also be designed to operate in a full wave mode wherein a period of ringing current and of ringing voltage is produced for each half cycle of the supply voltage. As shown in FIG. 25, this can be accomplished by modifying the circuit of FIG. 22 to add a second switching circuit 908 which is identical to the first switching circuit 972 except for facing current wise and voltage wise in the opposite direction to the first circuit 972. That is, in FIG. 25 the first circuit 972 operates as described above during each positive half cycle of the applied voltage and the second circuit 908 operates in the same way during the negative half cycles of the applied voltage, and as a result, the number of periods of current and voltage ringing over a given period of time is doubled in comparison to the number of periods produced in the same period of time by the circuit of FIG. 22.

Figure 26:
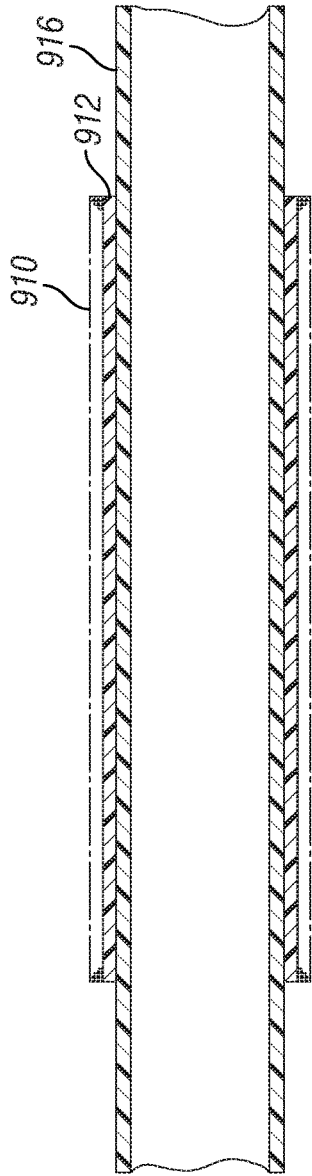
FIG. 26 is a view similar to FIG. 21 but showing a modified embodiment of the invention in which the pipe unit has only one coil surrounding the liquid flow pipe.
Figure 27:
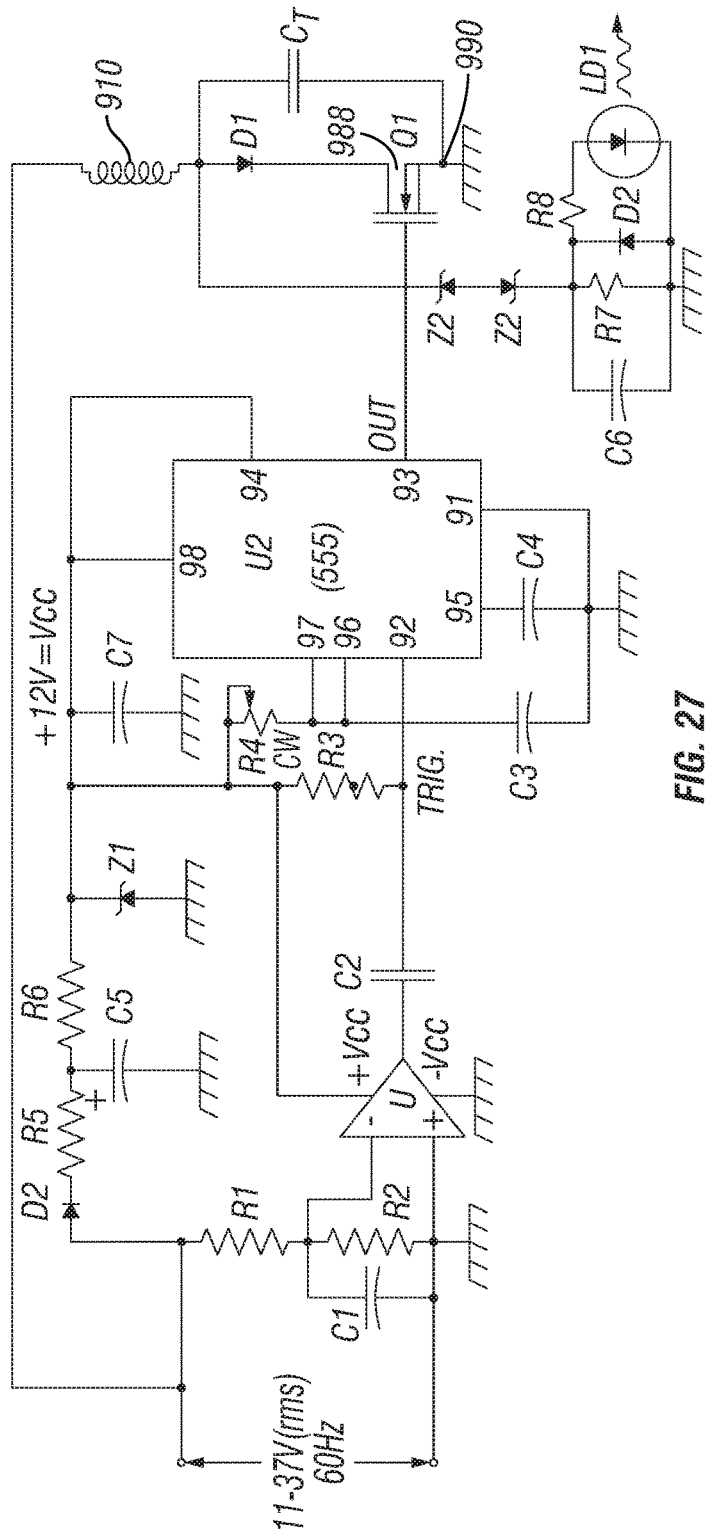
FIG. 27 is a detailed circuit diagram similar to FIG. 23 but showing an electrical circuit for use with the pipe unit of FIG. 27.

Also, as mentioned above, the number of coils used in the pipe unit 912 may be varied and if wanted, the pipe unit 912 may be made with only one coil without departing from the invention. FIGS. 26 and 27 relate to such a construction with FIG. 26 showing the pipe unit to have a single coil 910 wound on a bobbin 912 and surrounding the pipe 916. The switching circuit used with the single coil pipe unit of FIG. 26 is illustrated in FIG. 27 and is generally similar to that of FIG. 23 except, that because of the single coil 910 producing no significant wiring capacitance, it is necessary to provide the tuning capacitor ($C_t$) across the first and second terminals 988 and 990 of the switch (Q1). Further, since the coil means is made up of the single coil 910 and located entirely on one side of the switch (Q1), it is unnecessary to provide the isolation transformer 976 of FIG. 23 to establish a local ground for the components of the switching circuit.

In still a further example, seen in FIG. 18 means for co-mingling comprises a manifold 186 having input ports for a plurality of flows of positively-charged water from multiple means for generating positive charge 184 and an output port connected to valve 188 directing an output flow of water having positive charges therein to a blender for use in well fracturing operations. In a variety of examples, the majority of the suspended solids are less than about 100 microns. In some such examples substantially all the suspended solids are less than about 100 microns. In a more limited set of examples, the majority of the suspended solids are less than about 10 microns. In an even more limited set of examples, substantially all the suspended solids are less than about 10 microns.

Figure 16:
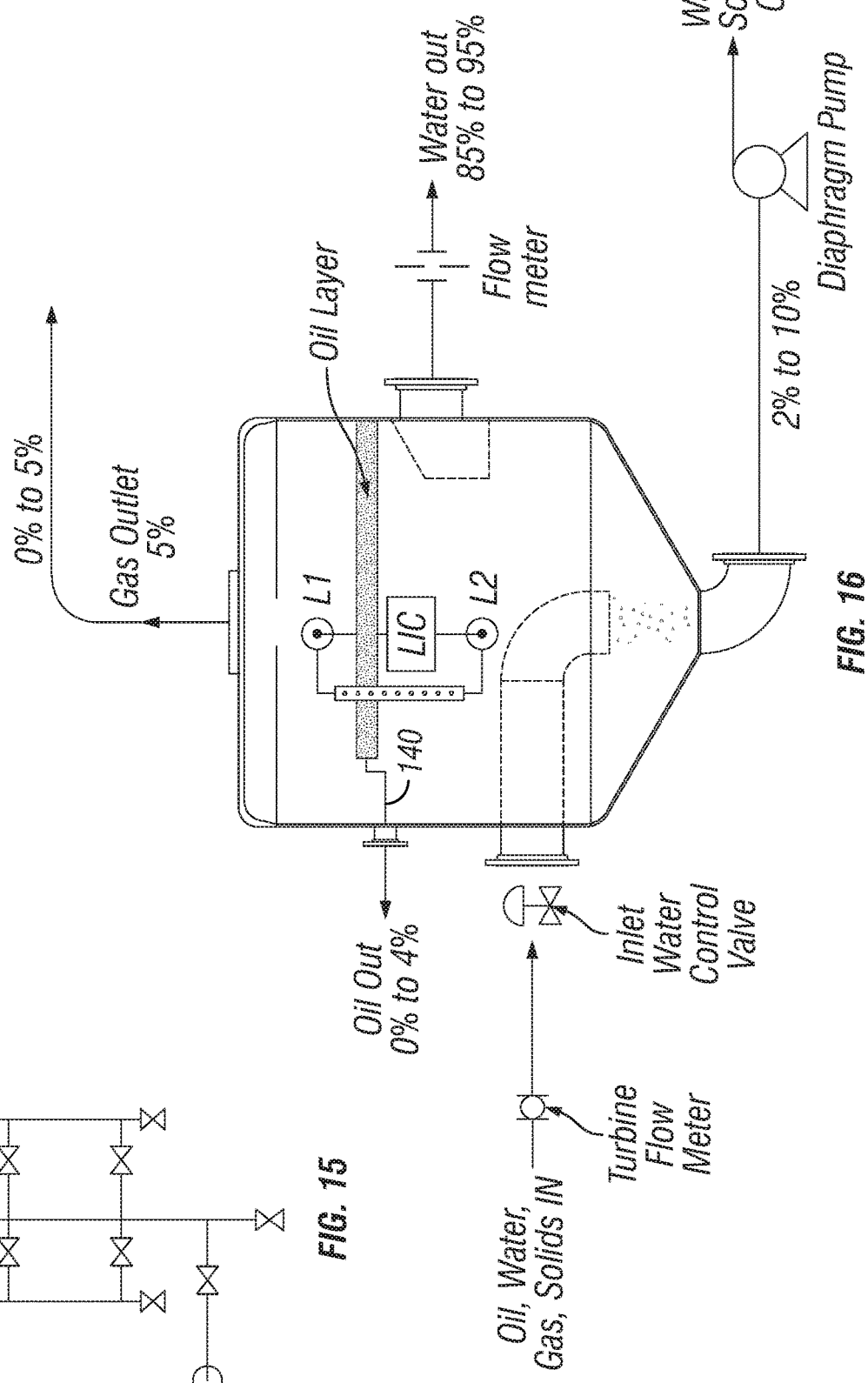
FIG. 16 is a representational view of a system useful in examples of the invention.
Figure 17:
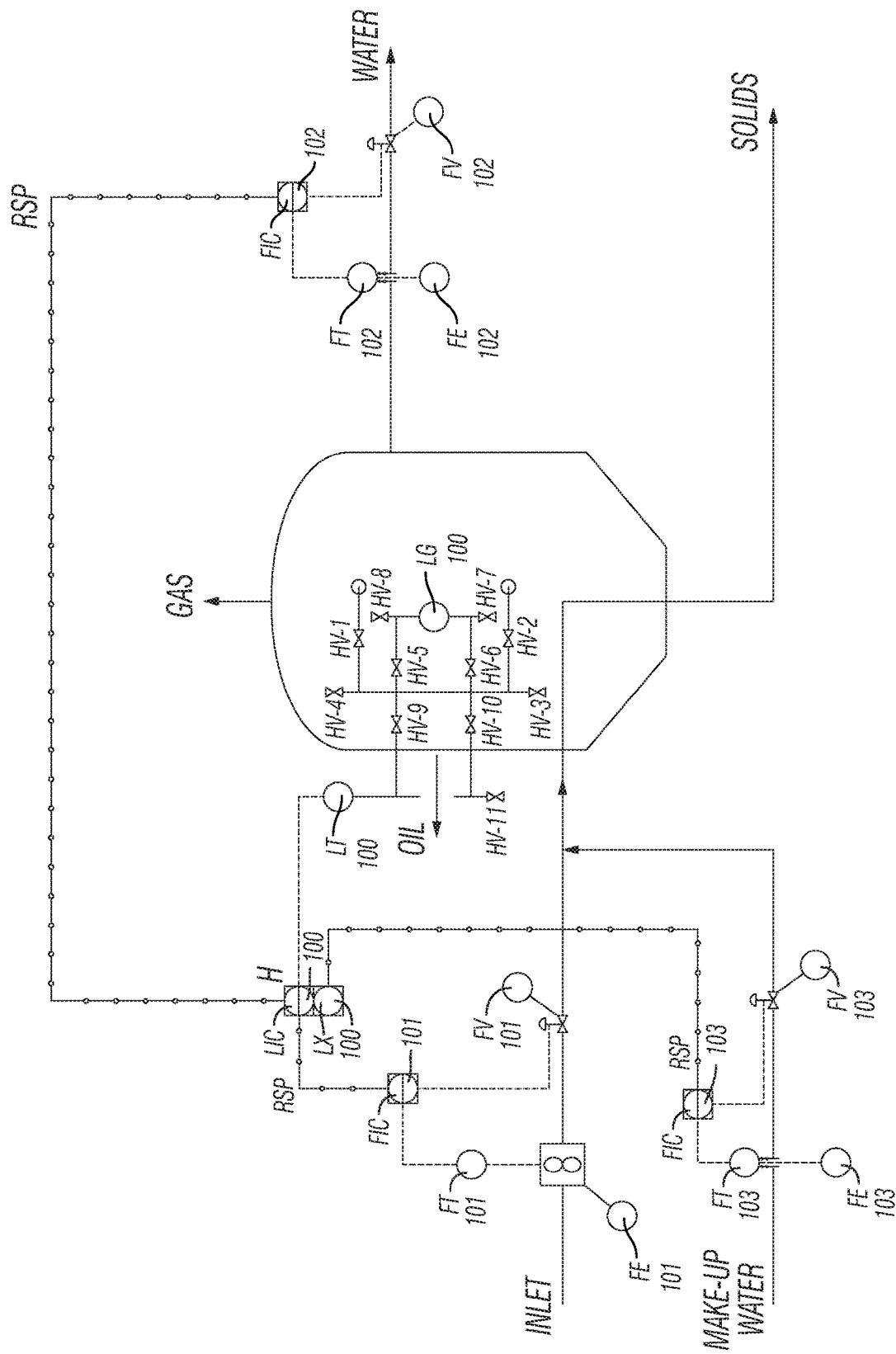
FIG. 17 is a schematic of a control system useful according to examples of the invention.

Referring now to FIGS. 16 and 17, a system is shown for controlling of water/liquid hydrocarbon interface in the three-phase separator, where in the system comprises: means for establishing a water/liquid hydrocarbon interface in a three-phase separator; means for measuring the water/liquid hydrocarbon interface in the three-phase separator, wherein a water/liquid hydrocarbon interface measurement signal results; means for comparing the water/liquid hydrocarbon interface measurement signal to a set point, wherein a comparison signal results; means for reducing the flow into the three-phase separator of hydrocarbon well fracture water when the comparison signal indicates the water/liquid hydrocarbon interface is above the set point and for increasing flow into the three-phase separator when the comparison signal indicates the water/liquid hydrocarbon interface is below the set point, wherein the increasing flow comprises hydrocarbon well fracture water from and make-up water.

Figure 14A:
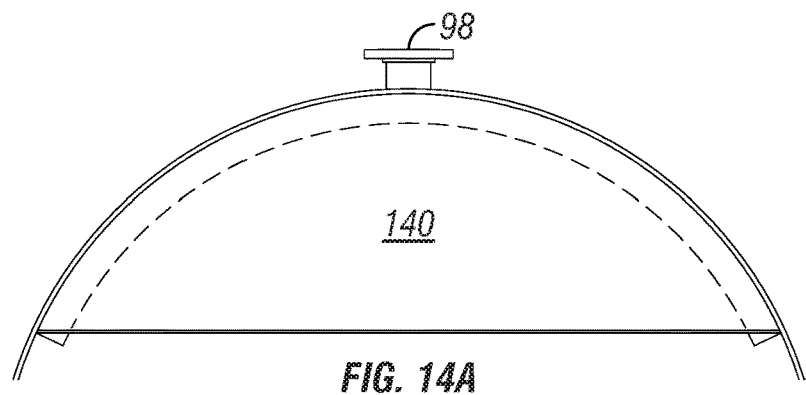
FIG. 14A is a top view of a component of an example of the invention.
Figure 14B:
FIG. 14B is a section view of the component of FIG. 14A.
Figure 15:
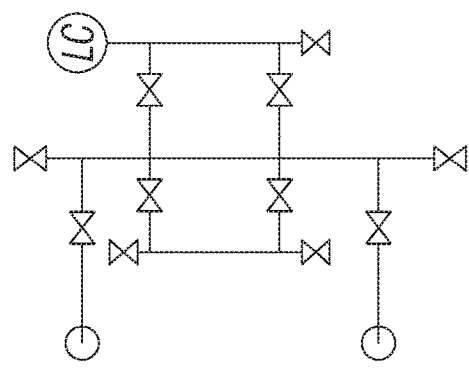
FIG. 15 is a schematic of a control system useful in examples of the invention.

In at least one example, best seen in FIGS. 14A and 14B, the means for establishing a water/liquid hydrocarbon interface comprises a diaphragm wier 140, and, ideally, the oil-water interface is established at the wier-bottom 140b. Controlled by flow meters and control valves seen in FIGS. 15 and 16.

Referring now to FIG. 17, a more detailed example is seen of the interface level control of a three phase, four material separator is provided. As seen in the Figure, inlet flow of flow-back water to the separator is measured by turbine meter (FE-101)/transmitter (FT-101) and controlled by flow control valve (FV-101) via flow controller (FIC-101.). Make-up water inlet flow is measured by orifice plate (FE-103)/dP transmitter (FT-103) and controlled by flow control valve (FV-103) via flow controller (FIC-103). Water outflow is measured by orifice plate (FE-102)/dP transmitter (FT-102) and controlled by flow control valve (FV-102) via flow controller (FIC-102). The oil and water interface level in the separator is measure by magnetic level gauge (LG-100) and also by continuous capacitance level transmitter (LT-100). Both level devices are mounted on an external level bridle made up of 2 inch diameter pipe. The bridle comprises manual valves (HV-1, HV-2, HV-3, HV-4, HV-5, HV-6, HV-9, and HV-10) for maintenance on the bridle and attached instrumentation as will occur to those of skill in the art, HV-1 and HV-2 are used to isolate the bridle from the process. HV-3 and HV-4 are used to drain and vent the bridle respectively. HV-5 and HV-6 are used to isolate the level gauge from the process. HV-9 and HV-10 are used to isolate the level transmitter chamber from the process. Each instrument on the bridle is equipped with valves for maintenance. HV-7 and HV-8 are a part of the level gauge and are used to drain and vent the level gauge respectively, HV-11 is a part of the level transmitter chamber and is used to drain the chamber.

The water/liquid hydrocarbon interface (aka "oil/water interface") level in the separator is maintained by level controller (LIC-100) with cascade control to flow-back inlet flow controller (FIC-101), make-up water inlet flow controller (FIC-103) and water outflow controller (FIC-102). Cascade control is accomplished by the level controller sending a remote set point (RSP) to the associated flow controllers and resetting their set points to maintain interface level.

All controllers are set for steady state condition to maintain normal liquid level (NLL=50%). Set points for individual controllers are determined by desired capacity and separator sizing.

In one operational example, as the interface level increases, the level controller resets the water outflow controller to throttle open while resetting the flow-back inlet flow controller to throttle back to maintain normal liquid level. An high liquid level (HLL=80%) alarm is triggered from an interface level transmitter analog signal to an operator, allowing the operator should take appropriate actions to regain control of the interface level or operating conditions.

As interface level decreases, the level controller resets the water outflow controller to throttle back while the resetting flow-back inlet flow controller to throttle open to maintain normal liquid level. If interface level decreases to a low liquid level (LLL=10%), the system places the make-up water flow controller on cascade control from the interface level controller by software switch LX-100.

It should be kept in mind that the previously described embodiments are only presented by way of example and should not be construed as limiting the inventive concept to any particular physical configuration. Changes will occur to those of skill in the art from the present description without departing from the spirit and the scope of this invention. Each element or step recited in any of the following claims is to be understood as including to all equivalent elements or steps. The claims cover the invention as broadly as legally possible in whatever form it may be utilized. Equivalents to the inventions described in the claims are also intended to be within the fair scope of the claims. All patents, patent applications, and other documents identified herein are incorporated herein by reference for all purposes.

What is claimed is:

1. A method for recovering fracture water from produced fluids comprising water, liquid and condensed gaseous hydrocarbons, and an aqueous slurry comprising suspended particulate solids, from a subterranean formation comprising hydrocarbon bearing shale, following fracturing, the method comprising:

directing produced fluids from the formation into a three phase separator tank wherein the separator tank has: a bottom of the tank and a top of the tank; at least one inlet port for receiving into the tank the produced fluids; at least one outlet port at or near the top of the tank for removing from the tank hydrocarbon gases released from the produced fluids; at least one outlet port at or near the bottom of the tank for removing from the tank slurries suspending solid particles from the produced fluids; at least one side port for removing from the tank hydrocarbon liquids from the produced fluids; and at least one side port for removing water from the tank; wherein the at least one side port for removing the hydrocarbon liquids is positioned higher than the at least one side port for removing water from the tank and wherein there is a desired set point in the tank for establishing a water/liquid hydrocarbon interface between the at least one side port for removing hydrocarbon liquids and the at least one side port for removing water from the tank;

having a system associated with the three phase separator tank for establishing and automatically controlling a water/liquid hydrocarbon interface within the three phase separator tank, wherein the system comprises: means for first establishing a water/liquid hydrocarbon interface in the three phase separator tank; means for measuring the level of the water/liquid hydrocarbon interface within the three phase separator tank, wherein a water/liquid hydrocarbon interface measurement signal results; means for comparing the water/liquid hydrocarbon interface measurement to a set point, wherein a comparison signal results; means for reducing the flow of produced fluids into the three phase separator tank when the comparison signal indicates the water/liquid hydrocarbon interface is above the set point, and means for increasing the flow of produced fluids into the three phase separator tank when the comparison signal indicates the water/liquid hydrocarbon interface is below the set point and/or supplementing the flow of produced fluids into the three phase separator tank when the comparison signal indicates the water/liquid hydrocarbon interface is below the set point by introducing into the three phase separator tank make-up water from a make-up water storage tank or lagoon, so as to substantially maintain the level of the water/liquid hydrocarbon interface, so that hydrocarbon liquids are removed from the tank through the at least one side port for removing hydrocarbon liquids and water is removed from the three phase separator tank through the at least one side port for removing water;

allowing the produced fluids to separate in said system into gaseous hydrocarbons, liquid hydrocarbons, water, and aqueous slurry comprising suspended particulate solids;

substantially maintaining the water/liquid hydrocarbon interface at a set point within the three phase separator tank; and removing water from the three phase separator tank through the at least one side port for removing water.

2. The method of claim 1 further comprising also removing from the three phase separator tank liquid hydrocarbons through the at least one side port for removing liquid hydrocarbons, gaseous hydrocarbons through the at least one outlet port for removing gaseous hydrocarbons, and slurry suspending solid particulates through the at least one outlet port for removing slurry suspending solid particulates, while maintaining the water/hydrocarbon interface in the tank, and receiving into said tank additional produced fluids for separation.

3. The method of claim 1 further comprising storing said removed water for further use.

4. The method of claim 1 wherein the means for establishing a water/liquid hydrocarbon interface comprises a diaphragm weir.

5. The method of claim 1 wherein the means for measuring the level of the water/liquid hydrocarbon interface comprises a liquid level indicator controller-type sensor.

6. The method of claim 1 wherein the means for comparing the water/liquid hydrocarbon interface measurement signal to a set point comprises a continuous capacitance level transmitter.

7. The method of claim 1 wherein the means for reducing and for increasing the flow into the three phase separator comprises a turbine type flow meter and an inlet type control valve in-line with the input of the three-phase separator tank.

8. The method of claim 1 further comprising a means for decreasing and increasing the flow exiting the three-phase separator tank.

9. The method of claim 8 wherein the means for decreasing and increasing the flow exiting the three-phase separator comprises an orifice-type flow controller controlling the water output of the three-phase separator tank.

10. A method for recovering fracture water from produced fluids comprising water, liquid and condensed gaseous hydrocarbons, and an aqueous slurry comprising suspended particulate solids, from a subterranean formation comprising hydrocarbon bearing shale, following fracturing, the method comprising:

directing produced fluids from the formation into a three phase separator tank wherein the separator tank has: a bottom of the tank and a top of the tank; at least one inlet port for receiving into the tank the produced fluids; at least one outlet port at or near the top of the tank for removing from the tank hydrocarbon gases released from the produced fluids; at least one outlet port at or near the bottom of the tank for removing from the tank slurries suspending solid particles from the produced fluids; at least one side port for removing from the tank hydrocarbon liquids from the produced fluids; and at least one side port for removing water from the tank; wherein the at least one side port for removing the hydrocarbon liquids is positioned higher than the at least one side port for removing water from the tank and wherein there is a desired set point in the tank for establishing a water/liquid hydrocarbon interface between the at least one side port for removing hydrocarbon liquids and the at least one side port for removing water from the tank;

having a system associated with the three phase separator tank for establishing and automatically controlling a water/liquid hydrocarbon interface within the three phase separator tank, wherein the system: first establishes a water/liquid hydrocarbon interface in the three phase separator tank; measures the level of the water/liquid hydrocarbon interface within the three phase separator tank, wherein a water/liquid hydrocarbon interface measurement signal results; compares the water/liquid hydrocarbon interface measurement to a set point, wherein a comparison signal results; reduces the flow of produced fluids into the three phase separator tank when the comparison signal indicates the water/liquid hydrocarbon interface is above the set point, and increases the flow of produced fluids into the three phase separator tank when the comparison signal indicates the water/liquid hydrocarbon interface is below the set point and/or supplements the flow of produced fluids into the three phase separator tank when the comparison signal indicates the water/liquid hydrocarbon interface is below the set point by introducing into the three phase separator tank make-up water from a make-up water storage tank or lagoon, so as to substantially maintain the level of the water/liquid hydrocarbon interface, so that hydrocarbon liquids are removed from the tank through the at least one side port for removing hydrocarbon liquids and water is removed from the three phase separator tank through the at least one side port for removing water;

allowing the produced fluids to separate in said system into gaseous hydrocarbons, liquid hydrocarbons, water, and aqueous slurry comprising suspended particulate solids;

substantially maintaining the water/liquid hydrocarbon interface at a set point within the three phase separator tank; and removing water from the three phase separator tank through the at least one side port for removing water.

11. The method of claim 10 further comprising also removing from the three phase separator tank liquid hydrocarbons through the at least one side port for removing liquid hydrocarbons, gaseous hydrocarbons through the at least one outlet port for removing gaseous hydrocarbons, and slurry suspending solid particulates through the at least one outlet port for removing slurry suspending solid particulates, while maintaining the water/hydrocarbon interface in the tank, and receiving into said tank additional production fluids for separation.

* * * * *